(12) United States Patent
Gerber et al.

(10) Patent No.: US 11,772,839 B2
(45) Date of Patent: Oct. 3, 2023

(54) GRABBER CLAMP FOR MATERIAL HANDLING AND APPARATUS AND METHOD FOR HANDLING BALE MATERIALS

(71) Applicant: HUNTERWOOD TECHNOLOGIES LTD., Cochrane (CA)

(72) Inventors: Andrew Gerber, Cochrane (CA); Rick Littlewood, Cochrane (CA); Ian Kienlen, Edmonton (CA)

(73) Assignee: HUNTERWOOD TECHNOLOGIES LTD

( * ) Notice: Subject to any disclaimer, the term of this patent is extended or adjusted under 35 U.S.C. 154(b) by 207 days.

(21) Appl. No.: 16/938,831

(22) PCT Filed: Jan. 23, 2019

(86) PCT No.: PCT/CA2019/000007
§ 371 (c)(1),
(2) Date: Jul. 31, 2020

(87) PCT Pub. No.: WO2019/144218
PCT Pub. Date: Aug. 1, 2019

(65) Prior Publication Data
US 2021/0024238 A1 Jan. 28, 2021

Related U.S. Application Data

(60) Provisional application No. 62/621,342, filed on Jan. 24, 2018.

(51) Int. Cl.
*B65B 69/00* (2006.01)
*B25J 9/00* (2006.01)
(Continued)

(52) U.S. Cl.
CPC ......... *B65B 69/0033* (2013.01); *B25J 9/0093* (2013.01); *B25J 15/0033* (2013.01); *B26D 7/02* (2013.01)

(58) Field of Classification Search
CPC .. B25J 9/0093; B25J 15/0033; B25J 15/0042; B26D 7/02; B65B 69/0033
See application file for complete search history.

(56) References Cited

U.S. PATENT DOCUMENTS

| 2,994,800 A | 9/1860 | Beardsley |
| 3,513,522 A | 5/1970 | Thomson |

(Continued)

FOREIGN PATENT DOCUMENTS

| CA | 2039170 C | 9/1995 |
| CN | 103072142 U | 9/2014 |

(Continued)

OTHER PUBLICATIONS

Norman Hendrich, Hannes Bistry and Jianwei Zhang, "Architecture and Software Design for a Service Robot in an Elderly-Care Scenario" (2015) 1:1 ScienceDirect <online: https://www.sciencedirect.com/science/article/pii/S209580991630042X>.

(Continued)

*Primary Examiner* — Saul Rodriguez
*Assistant Examiner* — Brendan P Tighe
(74) *Attorney, Agent, or Firm* — Jason P. Webb; Pearson Butler

(57) ABSTRACT

A material handling apparatus and method is disclosed, including a grabber clamp apparatus and method for handling, such as grabbing and pulling, elongate binding material. The grabber clamp is capable of gripping one or more elongate binding material strands securely enough to pull it from the bale but without cutting the elongate binding material strand(s). The current invention also provides an (Continued)

elongate binding material puller for removing elongate binding material from a bale. The elongate binding material puller should be capable of automatically, mechanically removing elongate binding material from a bale. The method uses a grabber clamp to grip a strand of elongate binding material between two blunt points such that a portion of the elongate binding material is free from clamping pressure between the two blunt points.

29 Claims, 16 Drawing Sheets

(51) Int. Cl.
  *B25J 15/00* (2006.01)
  *B26D 7/02* (2006.01)

(56) References Cited

U.S. PATENT DOCUMENTS

| | | | |
|---|---|---|---|
| 4,348,801 A | | 9/1982 | Dumont et al. |
| 5,131,135 A | * | 7/1992 | Gronau ............... B65B 69/0025 |
| | | | 83/909 |
| 5,179,878 A | | 1/1993 | Kranefeld et al. |
| 5,249,341 A | | 10/1993 | Gronau |
| 5,297,329 A | | 5/1994 | Santin et al. |
| 5,680,691 A | | 10/1997 | Maronn et al. |
| 5,718,157 A | | 2/1998 | Hawley et al. |
| 5,762,390 A | * | 6/1998 | Gosselin ................ B25J 15/103 |
| | | | 901/33 |
| 5,901,626 A | | 5/1999 | Temburg |
| 8,769,801 B2 | | 7/2014 | Lyman |
| 9,394,145 B2 | | 7/2016 | Yada et al. |
| 9,533,233 B2 | | 1/2017 | Rucker et al. |
| 2008/0073922 A1 | | 3/2008 | Holtz |
| 2017/0151679 A1 | * | 6/2017 | Wong .................. B25J 15/0061 |
| 2018/0169870 A1 | * | 6/2018 | Nakayama ............... B25J 15/10 |
| 2021/0107170 A1 | * | 4/2021 | Albright ................ B25J 15/103 |

FOREIGN PATENT DOCUMENTS

| | | |
|---|---|---|
| CN | 105128024 B | 12/2015 |
| CN | 204935669 U | 1/2016 |
| CN | 207030743 U | 2/2018 |
| EP | 2597064 B1 | 4/2014 |
| EP | 3023340 A1 | 5/2016 |
| JP | 2017136672 A | 8/2017 |
| WO | WO 2006/065222 A1 | 6/2006 |

OTHER PUBLICATIONS

Neilsen and Hiebert, "Manual and Automated Bale Dewiring" <online: http://neilsenandhiebert.com/bale-dewiring.html>.
ADC Ltd, (2012) "Paper robot de wire sales video R00" <online: https://www.youtube.com/watch?v=RUkiBc2upaM>.

* cited by examiner

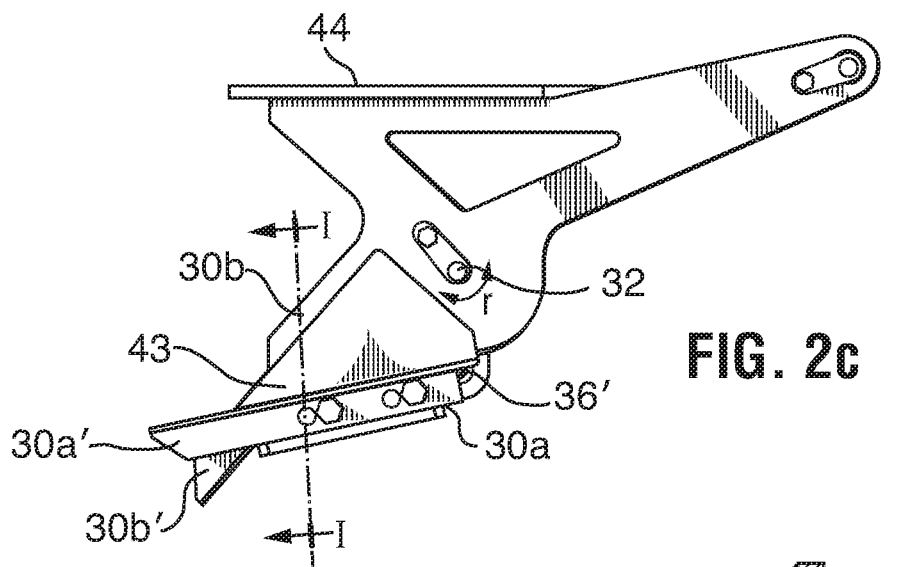
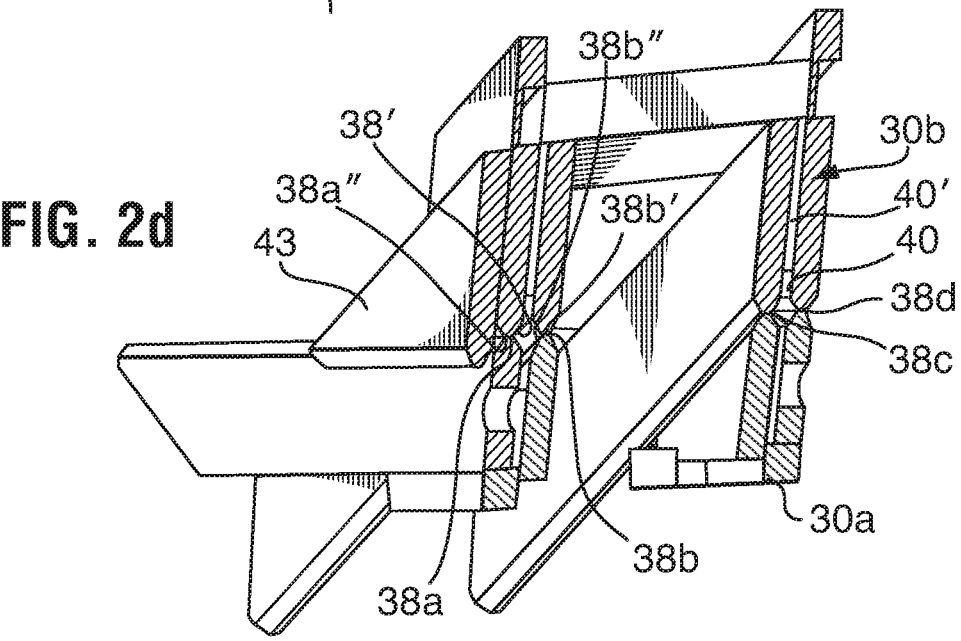
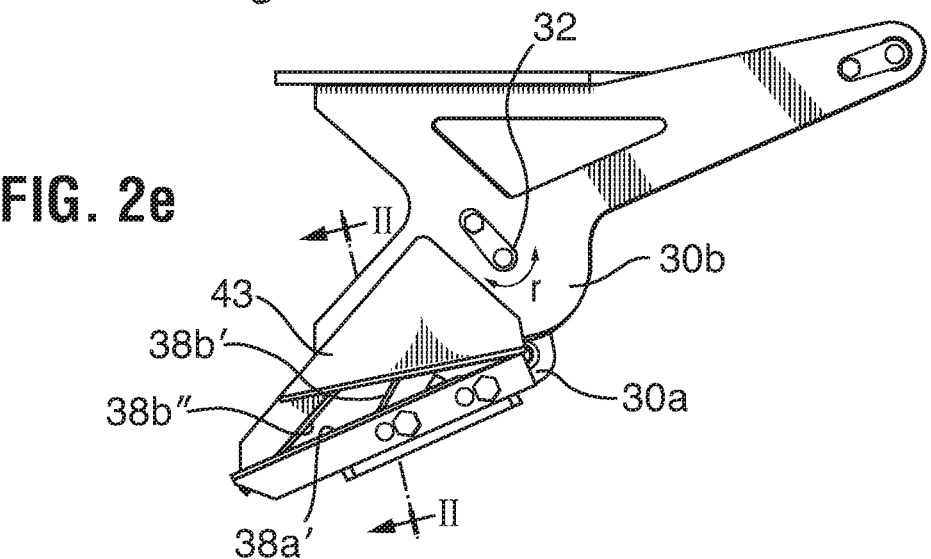

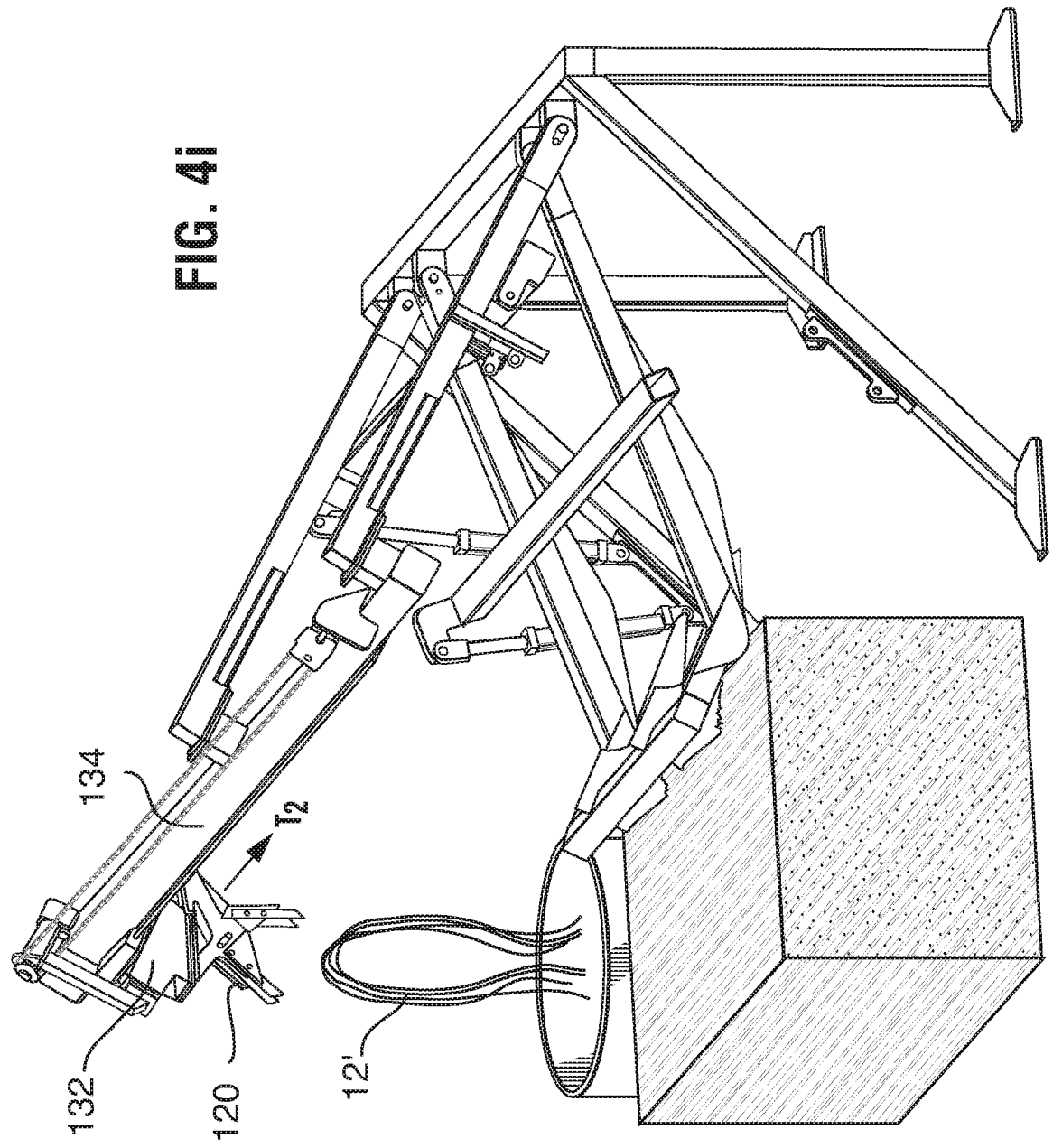

GRABBER CLAMP FOR MATERIAL HANDLING AND APPARATUS AND METHOD FOR HANDLING BALE MATERIALS

BACKGROUND OF THE INVENTION

Field of the Invention

The invention relates to material handling apparatus and methods. In particular, the invention relates to a grabber clamp for material handling and an apparatus and method for pulling an elongate binding material from a bale.

Description of the Related Art

Grabber clamps are sometimes used to grasp and pull on materials for handling thereof. When handling elongate materials such as straps, elongate binding material, wire or other such materials, it is difficult to grip the materials firmly enough to be able to pull on the materials without also cutting them. Also, grabber clamps often don't work well when there is a variance in the number of material strands to be grasped. Also, grabber clamps may not work well when there is a bundle of strands, as the middle strands of material in the bundle are not held as firmly as the bundle's outer strands.

The problems with grabber clamps are evident in the area of bale handling. Baled materials such as of agricultural materials (i.e. grasses, cotton, twigs, leafy crops), sheet materials, such as newspapers or fabric, waste, etc. are often held together by elongate binding material such as of strapping, twine or other strings, cat gut, wire, netting, etc. There are processes where bales must be unbound for processing. In such a process, the binding material must be pulled off the bale and collected. However, the grabber clamps for grabbing and pulling the elongate binding material have been unreliable, such that removal of binding materials often is done manually by workers.

For example, the present applicant, Hunterwood Technologies Ltd., offers bale compressors, where multiple agricultural field bales are compressed into larger, denser bales for more efficient storage and transport. In preparation for compressing, field bales have their binding materials removed, as the binding materials cause problems for the compressor and end users of the compressed bales. In this removal process (sometimes called de-twining), a worker generally locates and pulls one to twenty individual elongate binding material strands per bale. This is costly and often challenging since (i) the elongate binding material can be pulled deep into the bale, (ii) the bale contents can vary significantly in characteristics including for example: twigs, grasses, leafy crops, etc. and (iii) the elongate binding material can have knots and kinks that cause the binding material to jam and prevent it from being manually pulled.

SUMMARY OF THE INVENTION

The current invention provides a grabber clamp for handling, such as grabbing and pulling, elongate binding material. The grabber clamp is capable of gripping one or more elongate binding material strands securely enough to pull it from the bale but without cutting the elongate binding material strand(s). The current invention also provides an elongate binding material puller for removing elongate binding material from a bale. The elongate binding material puller should be capable of automatically, mechanically removing elongate binding material from a bale.

In one aspect of the present invention, therefore, there is a provided a grabber clamp comprising a first jaw with a forward end and a rear end; a second jaw with a forward end, the second jaw configured to (i) move toward the first jaw to close the first and second jaws and (ii) move away from the first jaw, to open the first and second jaws; and a driver for driving movement of the first jaw and the second jaw to open and close; wherein the first jaw includes a first gripping face and the second jaw includes a second gripping face, the first and second gripping faces being configured to come together when closed to define a first blunt clamping point and a second blunt clamping point spaced from the first blunt clamping point and a non-clamping area between the first and second blunt clamping points.

In another aspect of the present invention, there is provided a method for gripping a strand of elongate binding material, the method comprising: operating a grabber clamp comprising: a. a first jaw; b. a second jaw moveable toward and away from the first jaw, the first and second jaws each including a forward end and a rear end; and c. a driver for driving movement of at least one of the first jaw and the second jaw to open and close the clamp; d. wherein the first jaw includes a first gripping face and the second jaw includes a second gripping face, the first and second gripping faces being configured to come together when the clamp is closed to define a first blunt clamping point and a second blunt clamping point spaced from the first blunt clamping point and a non-clamping area between the first and second blunt clamping points; and gripping the strand of elongate binding material at the first and the second blunt clamping points such that a portion of the strand of elongate binding material between the first and second blunt clamping points is free from a clamping pressure.

In yet another aspect of the present invention, there is provided an elongate binding material puller for removing elongate binding material from a bale, the elongate binding material puller comprising: a table surface; a grabber clamp mounted above the table surface and the grabber clamp including: a first jaw; a second jaw moveable relative to the first jaw, the first and second jaws each including a forward end opposite a rear end; and a jaws driver for driving movement of at least one of the first jaw and the second jaw to open and close the clamp; a conveyor for driving the bale along the table surface past the grabber clamp; and an elongate binding material lifting structure configured for riding along an upper surface of the bale and cutting into the bale upper surface to insert below the elongate binding material and to lift the elongate binding material away from the upper surface of the bale for gripping by the grabbing clamp.

In yet another aspect of the present invention, there is provided a method for removing a strand of elongate binding material from a bale, the method comprising: driving a conveyor to move the bale toward an elongate binding material puller; lifting the strand of elongate binding material away from an upper surface of the bale; gripping the strand of elongate binding material by inserting a grabbing clamp between the strand of elongate binding material and the upper surface of the bale; cutting the strand of elongate binding material; and operating the grabbing clamp to pull the strand of elongate binding material away from the bale and to deposit the strand of elongate binding material in a disposal area away from the bale.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 1c is an end view of the elongate binding material puller of FIG. 1a.

FIG. 2b is a side elevation of the grabber clamp of FIG. 2a.

FIG. 2c is a side elevation of another grabber clamp.

FIG. 2d is a section along line I-I of FIG. 2c.

FIG. 2e is the grabber clamp of FIG. 2c partially opened.

FIG. 4b is an underside perspective view of the elongate binding material lifting structure of FIG. 4a.

FIG. 4i is a top perspective view of the puller in a next stage of operation after FIG. 4h where the clamp has been moved laterally to deposit the elongate binding material in a disposal area alongside the puller. The clamp is ready to be moved laterally T2 to a position aligned above the space between the plows, such that it is ready to act on a new bale.

DETAILED DESCRIPTION OF THE INVENTION

A grabber clamp has been invented for handling elongate binding material or other string materials. The grabber clamp is capable of gripping one or more elongate binding material strands securely enough to pull the one or more strands but without cutting them. The grabber clamp was developed as part of a project to overcome problems encountered in de-twining bales. While the grabber clamp has applications beyond bale handling, an elongate binding material puller for bale processing is also described hereinbelow.

Figure 1A:
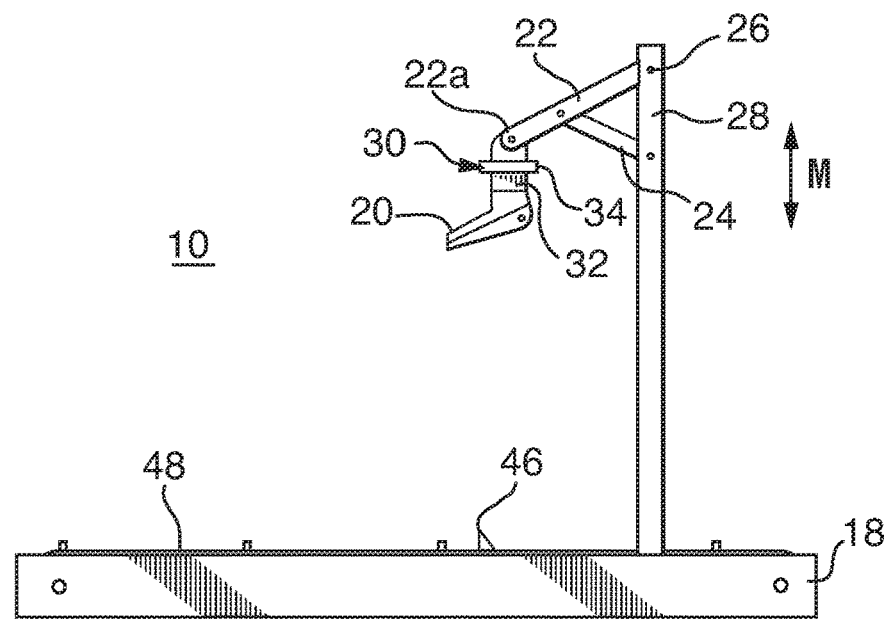
FIG. 1a is a schematic side view of an elongate binding material puller.
Figure 1C:
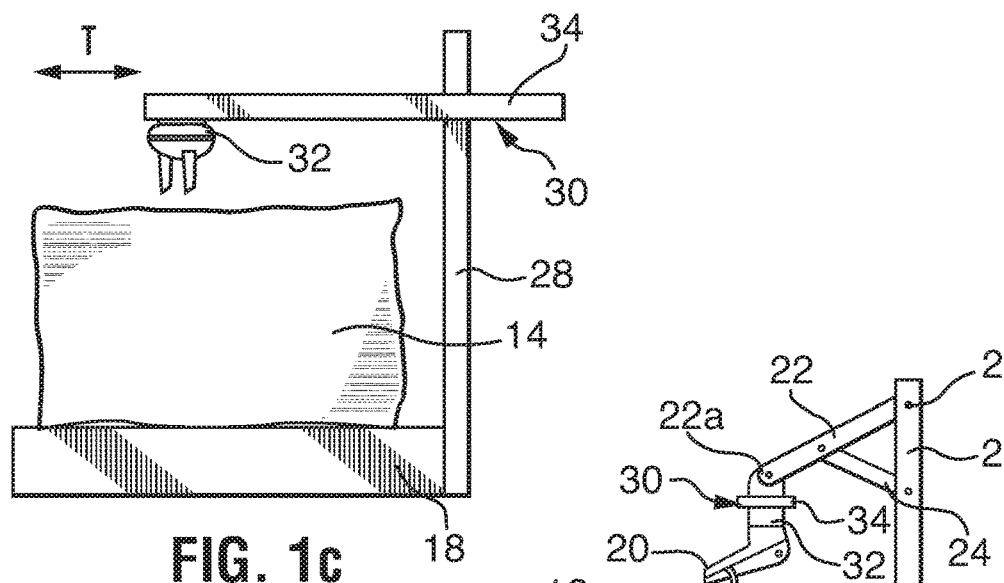
Figure 1B:
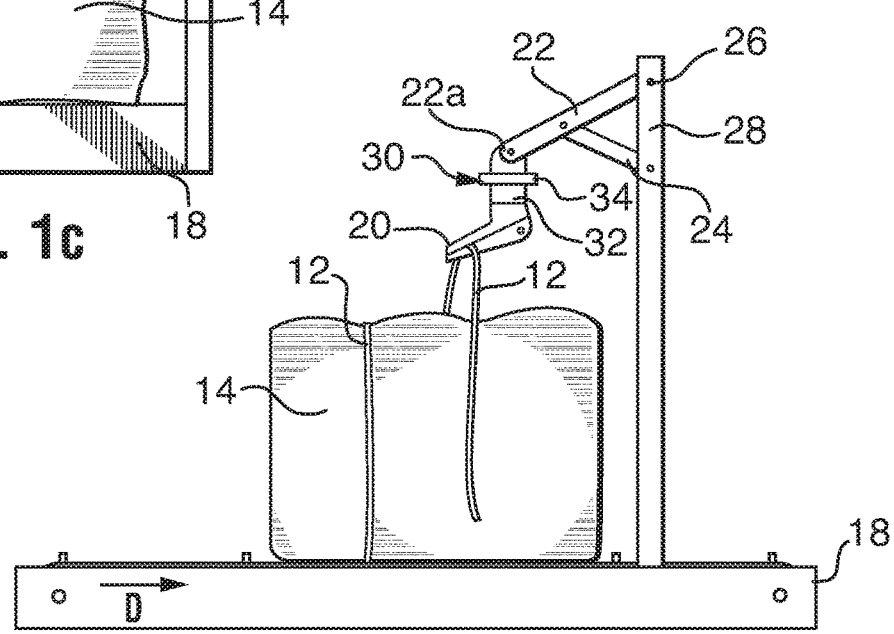
FIG. 1b is a side view of the elongate binding material puller of FIG. 1a operating to pull an elongate binding material from a bale.

FIGS. 1a to 1c show schematically an elongate binding material puller 10 for removing elongate binding material 12 from a bale 14. As will be appreciated, elongate binding material 12 is wrapped around a bale to hold the bale materials together. Each elongate binding material strand encircles a circumference of the bale. While the elongate binding material was applied to surround the outer surface, the tension in the strand may cause the elongate binding material to become embedded into the outer surface. There may be one to twenty individual elongate binding material strands on each bale. The elongate binding material may be made of various materials such as natural plant material or plastic string or bands. The elongate binding material strands may have a tension, depth of embedment and location, which vary from strand to strand and bale to bale. The elongate binding material puller is capable of removing automatically and mechanically these elongate binding material strands from a bale.

Elongate binding material puller 10 includes a table 18 on which the bale 14 is supported and a grabber clamp 20 mounted above the table and moveable toward and away from the table, and thereby any bale mounted on the table, to grasp the elongate binding material on the bale and pull the elongate binding material from around the bale.

Grabber clamp 20 was developed for handling, such as grabbing and pulling, elongate binding material. The grabber clamp operates for the elongate binding material puller in a position to grab elongate binding materials on the bale and pull them off the bale. In particular, the grabber clamp is mounted on or above the table and is moveable toward and away from the table. As such, the grabber clamp can be moved toward and away from a bale on the table. In one embodiment, the elongate binding material puller includes a grabber clamp mounting structure. The mounting structure may include an arm 22 and the grabber clamp is mounted on an outboard end 22a of the arm. Another portion of the arm is secured on the elongate binding material puller. In one embodiment, there is a driver such as a hydraulic cylinder 24 that drives the arm about a mount, such as a hinge 26, to drive the grabber clamp toward and away from the table. While the mounting structure may mount the grabber clamp under, alongside or above the table, in one embodiment, arm 22 is mounted to a frame 28 above the table and the arm and the hydraulic cylinder are configured to move grabber clamp 20 up and down, for example, from a position above the table to reach down toward the table, grasp an elongate binding material from a bale and pull the elongate binding material up. In one embodiment, the arm is configured to be moved down toward the table when the arm is positioned centrally above a middle portion of the table.

In that or another embodiment, the mounting structure may include a laterally moveable mechanism 30. The laterally moveable mechanism is configured to move the grabber clamp side to side above the table. Such an embodiment may be particularly useful where the mounting structure mounts the grabber clamp above the table and it is desired to move the grabber clamp laterally to release the removed elongate binding material from the clamp at a side of the table. For example, the grabber clamp may grasp an elongate binding material from a bale, and then may be moved beyond a side edge of the table where the elongate binding material may be released to drop into an elongate binding material discard area. Laterally moveable mechanism may include a slider 32 to which the grabber clamp is coupled and a track 34 along which the slider rides. The laterally moveable mechanism may be coupled between arm 22 and grabber clamp 20. In particular, the grabber clamp 20 may be mounted on the slider, the slider may be mounted on the track and the track may be mounted on outboard end 22a of the arm. In such an embodiment, the grabber clamp can be moved up and down, M, and side to side T.

Clamp 20 is configured to grip one or more elongate binding material strands securely enough to pull the one or more strands such as out from under the weight of a bale all while avoiding a strand breakage at the clamp. Breakage may leave a portion of the strand on the bale and is to be avoided.

Figure 2:
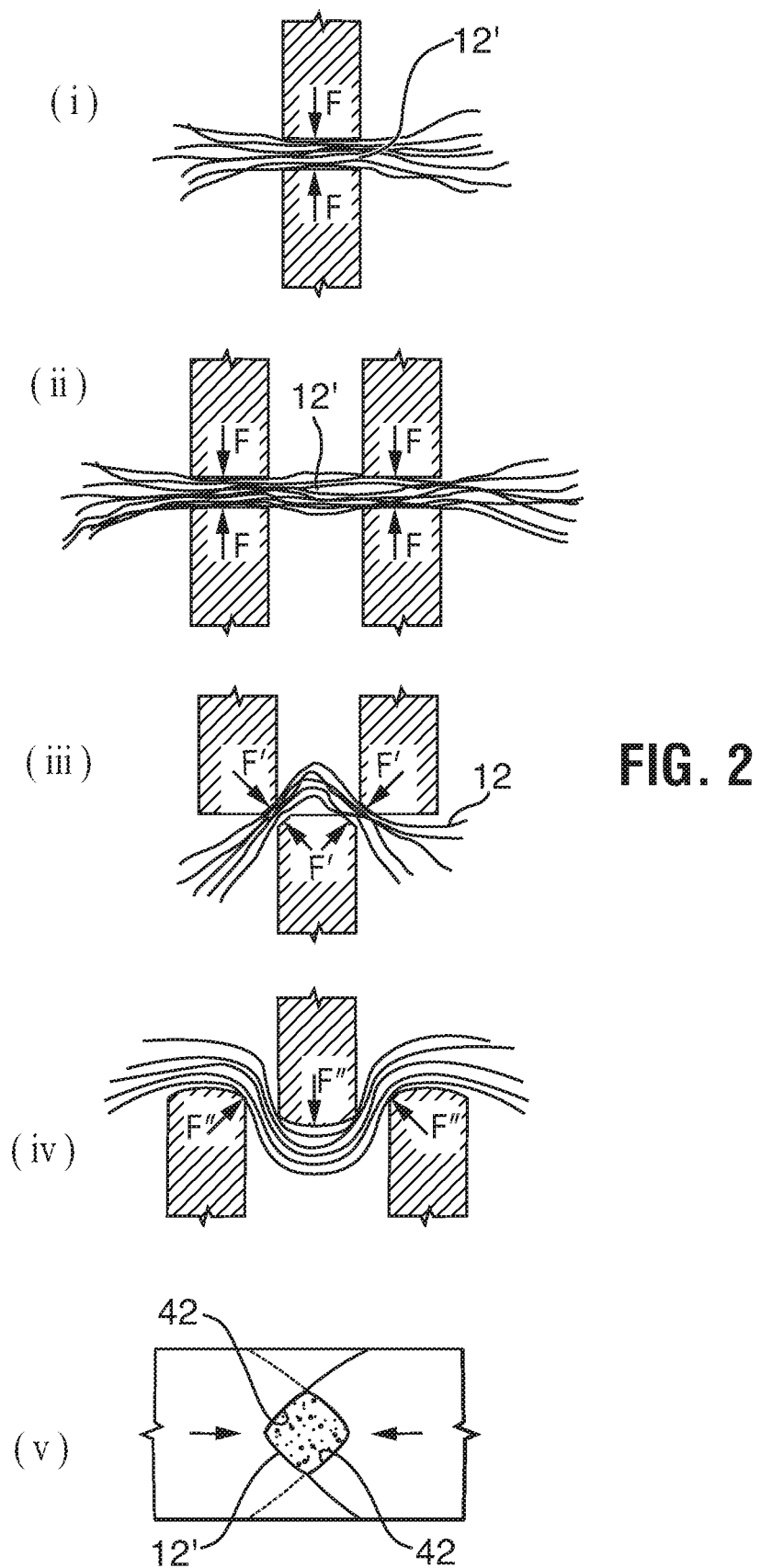
FIG. 2 is schematic illustration of clamping concepts.

The grabber clamp may be capable of gripping one or more elongate binding material strands securely enough to pull it from the bale without cutting the strands. The grabber clamp may be configured to clamp on an elongate binding material without cutting or melting, clamp on an elongate binding material in a weaved manner such that the elongate binding material assumes a tortuous or pleated configuration as it is gripped, grip the elongate binding material at more than one spaced apart point along its length and urge a gripped elongate binding material into a central area along the clamp. FIG. 2 shows these various gripping configurations one or more of which may be employed in the clamp. The gripping configurations may include:
  (i) blunt clamping, which pinches a material placed between them. Blunt clamping generates mechanical powered friction as two blunt, flat surfaces are forced, arrows F, together on a strand under tension. A blunt clamping configuration clamps on an elongate binding material without cutting or melting. This works well for a single strand but may be less effective securing a bundle of elongate strands;
  (ii) multiple, wherein spaced apart blunt clamps grip the elongate binding material at more than one spaced apart point along its length. This improves clamping on bundles of strands;
  (iii) wedging is a form of blunt clamping but the clamping forces, arrows F', develop a sliding effect and, thereby, more friction on the strand;
  (iv) interleaving, where a middle clamping surface moves into a slot between other clamping surfaces such that the clamping surfaces overlap or interleave. Interleaving weaves a clamped elongate binding material between the clamping surfaces. The clamped binding material is forced into a tortuous or pleated configuration as it is gripped. Forces F" between the clamping surfaces generate a dragging friction; and
  (v) constriction, where concave gripping faces urge a gripped elongate binding material into a central deeper areas 42 along the clamp's gripping faces. Constriction can include interleaving forces where the clamp surfaces overlap.

These configurations (i) to (v) can be each be applied in multiples or in various combinations.

With reference also to FIGS. 2a to 2d, grabber clamp 20 includes a pair of jaws 30 including a first jaw 30a and a second jaw 30b that are moveable toward and away from each other to a closed position and an open position. Jaws 30a, 30b each include a terminal end 30a', 30b'. Between their ends, jaws 30a, 30b each include opposing gripping faces 34a, 34b. Jaws 30 may be operated to move gripping faces 34a, 34b towards each other (i.e. to close) or away from each other (i.e. to open) by a driver 36 such as employing a parallel drive (for example a screw drive) or a hinged drive. The illustrated driver is a hinged drive using hydraulics such as a hydraulic cylinder connected at pivot points 36' that drives rotation, arrow r, of at least one jaw 30a about a fulcrum 32 that defines a hinged end of the jaws. In one embodiment, the jaw 30a that is driven to rotate to open and close the jaws is positioned on the underside of jaw 30b such that jaw 30a moves down to open (shown in solid lines in FIG. 2b) and moves up to close (shown in FIG. 2a and in broken lines in FIG. 2b).

Figure 2A:
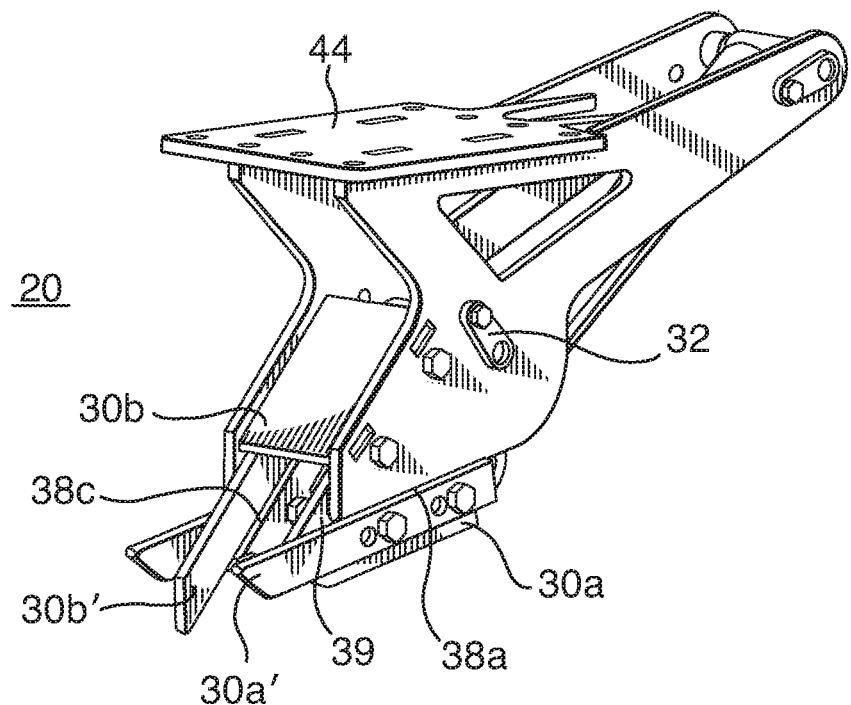
FIG. 2a is a front isometric view of a grabber clamp in a closed configuration.

The grabber clamp includes jaws 30a and 30b, and a driver 36 to allow the jaws to open and close. Each jaw has a gripping face 34a, 34b. The gripping faces are configured to come together when the clamp is closed to define two blunt clamping points separated by a non-clamping area. As illustrated in FIG. 2g, the two clamping points may form non-parallel planes.

Specifically, opposing gripping faces 34a, 34b are particularly configured to firmly grip one elongate binding material or more than one strand of elongate binding material but without risk of cutting or melting the elongate binding material as it is gripped. Opposing gripping faces 34a, 34b come together, for example, at a plurality of blunt clamping points 38a, 38b, 38c, 38d. Providing a plurality of clamping sites between the jaws at which the elongate binding material is gripped improves the holding force. This is especially true where a bundle of elongate binding material is being gripped and the bundle being gripped at a plurality of points along its length improves the gripping force of the overall bundle. Each blunt clamping point includes a blunt surface on one jaw aligned to clamp against a blunt surface on the other jaw's gripping face. When the jaws close, the aligned blunt clamping surfaces on the jaws butt tightly together. For example, grabber clamp 20 includes at least two and in one embodiment four blunt clamping points spaced apart from side to side of the clamp and comprised by eight surfaces (four on each jaw). Four surfaces are shown as 38a' and 38a" forming one aligned pair and 38b' and 38b" forming a second aligned pair in FIG. 2b. Each blunt clamping surface includes a blunt surface, which is laterally and axially flat, and that may be elongate extending along a portion of the jaw following a direction from hinged end to terminal end 30a', 30b'. The edges of the blunt clamping surfaces may be spaced apart and/or radiused such as by chamfering or rounding in order to eliminate sharp corners that may cut the elongate binding material. However, even if the edges are radiused or rounded, blunt butting surfaces should be maintained between the edges.

In one embodiment, some pairs of blunt clamping surfaces may be offset from other pairs to butt together in a plurality of planes. This means that an elongate binding material being clamped does not pass straight through from side to side of the clamp, but instead the elongate binding material is clamped in a woven manner such that the elongate binding material assumes a non-linear, tortuous configuration as it is gripped between the jaws. In such an embodiment, there is at least one blunt clamping point 38a on one plane and at least one blunt clamping point 38b on another plane. Any elongate binding material clamped at points 38a, 38b is bent and redirected as it is clamped such as may be achieved by moving the blunt clamping points in FIG. 2(ii) from being coplanar or as shown as wedging in FIG. 2(iii). In particular, the elongate binding material bundle 12' clamped at point 38a has to be bent and redirected to also be clamped at point 38b as shown in FIG. 2g.

Where the blunt clamping surfaces are configured in offset planes, there may be alternating high and low surfaces that alternate between two or more planes such that any elongate binding material passing through, from side to side, of clamp 20 may be forced into a pleated configuration. There may be two blunt clamping points in similar planes and an interleaved blunt clamping point between them at a different plane. In the illustrated embodiment, the two outer side clamping surfaces 38a, 38d are configured to form two spaced apart blunt clamping points in a first, substantially common plane P1 while the middle clamping surfaces 38b, 38c are configured to each form a blunt clamping point in a second plane P2. FIG. 2d shows a section orthogonal to plane P1, which is defined at the centre of 38a' and 38a". The elongate dimension of the blunt clamping surface planes P1, P2 are not only spaced apart but also non-parallel.

Effectively there is a groove between the two outer side clamping surfaces 38a, 38d that extends along a direction from back, hinge end to front, terminal end 30a', 30b' of the jaws and the middle clamping surfaces 38b, 38c are positioned in the groove. This multi-planar clamping causes a gripped elongate binding material to be woven between the clamp's opposing gripping faces and thereby held firmly.

In such an embodiment, wedging may be achieved by positioning surface 38a closely alongside surface 38b. Alternately, if there is a concern regarding cutting action, adjacent interleaved surfaces may have lateral open spaces between them such that a shearing action is avoided as the surfaces mesh together. For example, there may be an open gap 40 alongside clamping surface 38a that spaces it laterally from clamping surface 38b. In the illustrated embodiment, a spacer 40' ensures that gap 40 is maintained.

In addition or alternately, the clamp jaws may have a generally arcuate configuration along their length such that elongate binding material being gripping may be urged back toward fulcrum 32 or possibly into a central position along the faces 34a, 34b. For example, terminal ends 30a', 30b' may be angled to protrude towards each other and configured to overlap when closed. In the illustrated embodiment, for example, the terminal end of upper jaw 30b is shaped to project toward the lower jaw and upper jaw 30b overlaps with the terminal end of the lower jaw in the closed position and, in particular, the overlap is achieved by the interleaving of the upper jaw within the outer sides of lower jaw 30a at its terminal end. In one embodiment, faces 34a, 34b may have a generally concave configuration with the arc extending from the clamp's hinged end to its terminal end with a deepest area 42 aligned at a middle portion of each jaw. This arcuate form not only pushes elongate binding material back away from the terminal ends 30a', 30b' but toward the center (i.e. the center between the front and back of the jaws). If there are a number of strands of elongate binding material to be clamped, this arcuate form tends to urge the elongate binding material into a bundle. While in some embodiments, the entirety of the opposing clamping faces may overlap (as was described above with respect to planes P1, P2), the arcuate form may be configured such that the during closing the deepest areas 42 move into an overlapping configuration last, after the front and rear of the jaws have overlapped.

In the illustrated embodiment, deepest area 42 failed to interleave sufficiently such that an elongate binding material strand may pass straight through without being bent. Thus, a side plate 43 may be added, as shown in FIG. 2c-2f that extends beyond blunt clamping surfaces 38a and 38d to generate interleaving forces. With reference to FIG. 2d, side plate 43 is beside clamping points 38a and 38b. In the illustrated embodiment, side plate 43 does not include a clamping surface. In use, side plate 43 exerts interleaving force on the elongate binding material that is gripped between points 38a and 38b. With reference to FIG. 2a, in use, elongate material may be loose, or un-clampable, at blind spot 39. As illustrated in FIG. 2h, with the addition of plate 43, any material that is loose at blind spot 39 is secured by interleaving force. In addition or alternately, terminal ends 30a', 30b' may be formed as fingers without a surrounding housing. The fingers are elongate extensions beyond the main housing of the clamp to facilitate the overlap and meshing action. Additionally or alternately, terminal ends 30a', 30b' may include tapered tips. The taper may define a narrower leading edge at the opposing gripping faces 34a, 34b. Terminal end 30a' may include a tapered tip that tapers toward plane P1. Likewise, terminal end 30b' may include another tapered tip that tapers toward plane P2.

Figure 2B:
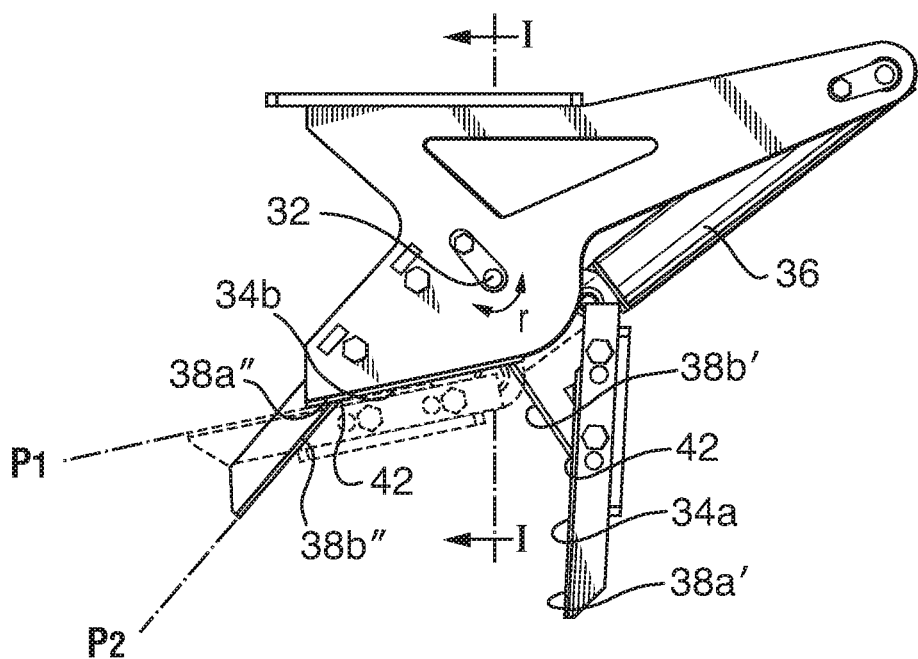
Figure 2F:
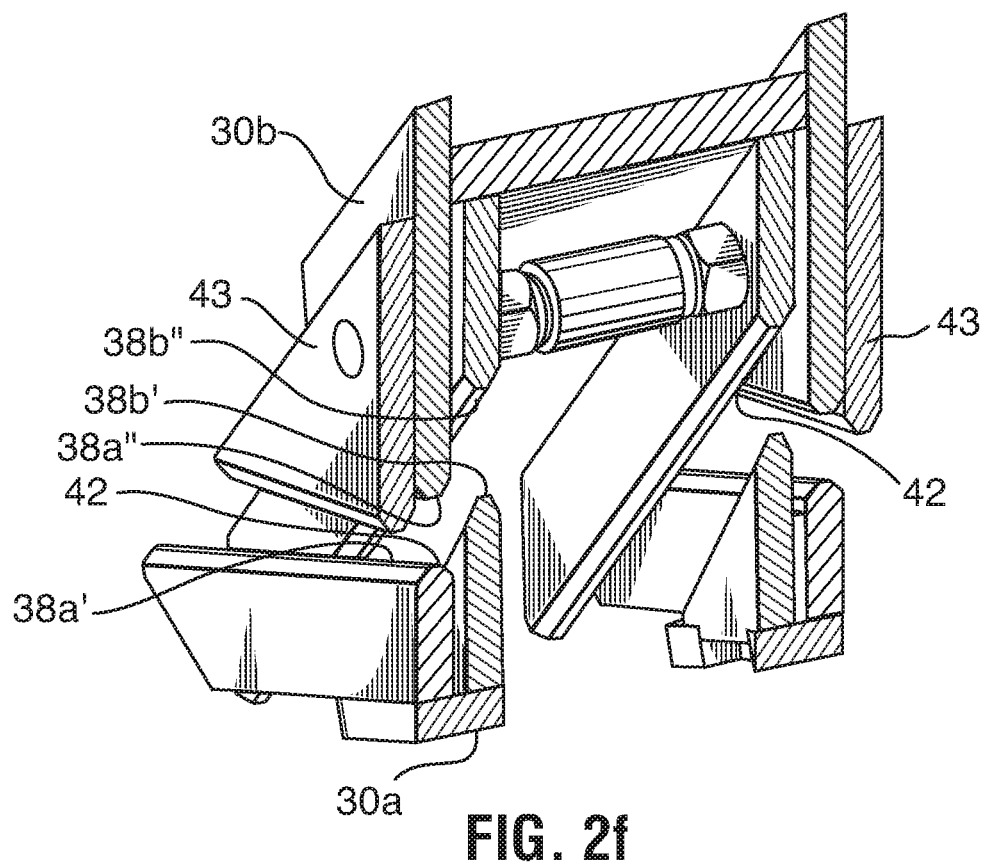
FIG. 2f is a section along line II-II of FIG. 2e.
Figure 2G:
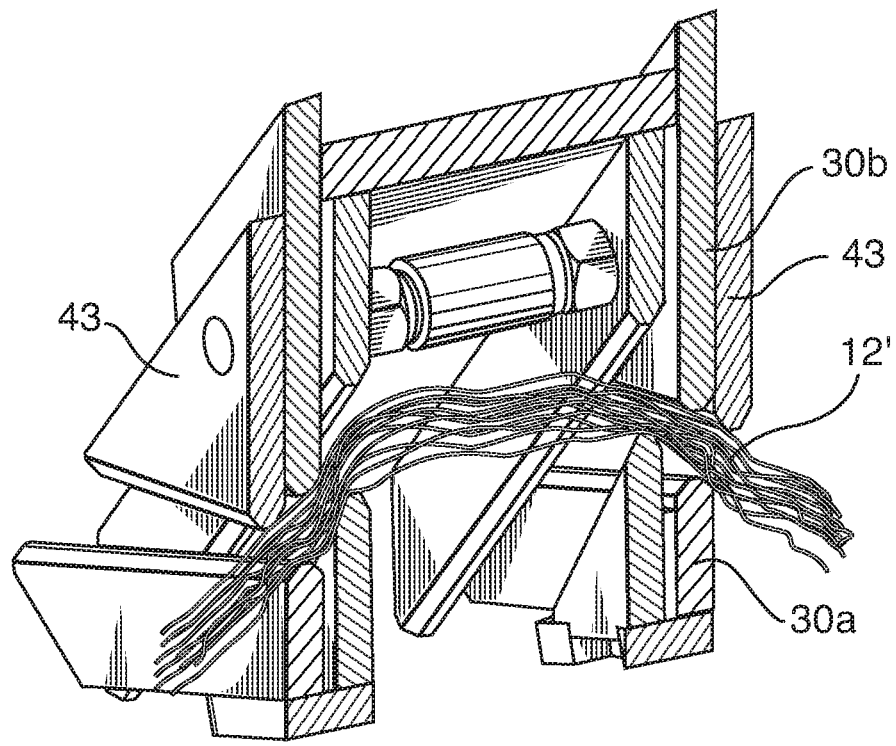
FIG. 2g is the grabber clamp of FIG. 2c showing a bundle of elongate binding material grasped by the grabber clamp.
Figure 2H:
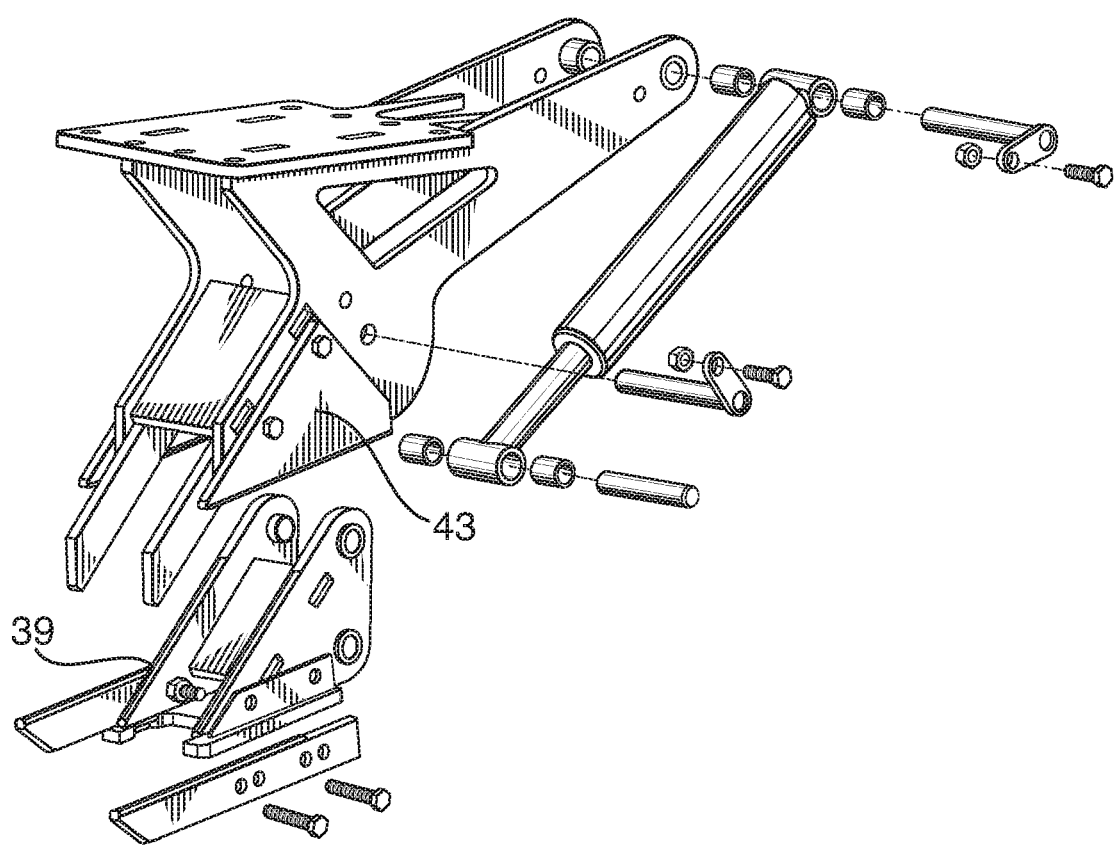
FIG. 2h is an exploded perspective view of a grabber clamp.

In summary, the illustrated embodiment of FIGS. 2a and 2b includes various clamp configurations, such as those illustrated in FIGS. 2(i)-(v). For example, in FIG. 2(i), the clamp may be configured such that two blunt members form one blunt clamping point, such as between surfaces 38a' and 38a" in FIGS. 2d and 2f. In FIG. 2(ii), two blunt members form a first blunt clamping point, and two more blunt members form a second blunt clamping point, such as the pair of blunt clamping points between surfaces 38a' and 38a", and between surfaces 38b' and 38b" in FIG. 2d. The first and second blunt clamping points clamp material along a common plane and have a non-clamping area between the two points. In FIG. 2(iii), three members form two clamping points. The first, second, and third members are arranged side-by-side, with the second member in the middle. The first and third members extend in a first direction, and the second member extends in the opposite direction. The corners of the members may be cut or flattened such that the corners are blunt, thereby making the clamping points blunt. The clamping configuration of FIG. 2(iv) is similar to that of FIG. 2(iii), but with sharp clamping corners and with space between each of the three members such that rather than creating blunt clamping points, clamping is achieved by interleaving force. In FIG. 2g, the elongate binding material 12' clamped at point 38a is redirected to be clamped at point 38b, this redirection causes the interleaving force. In FIG. 2(v), overlapping, opposing, v-shaped pieces 42 may close to secure material 12' within the narrow ends of the v-shapes. In some embodiments, it may be useful to further automate the bale handling. In such an embodiment, the table may be fit with a bale conveyor 48. The bale conveyor may be driven to move, arrow D, a bale along the table to the grabber clamp 20. The bale conveyor 48 may be a conveyor belt, push plate etc. to configure the table as a feed table.

Clamp 20 can be coupled to the mounting structure in any number of ways. In the illustrated embodiment, clamp 20 includes a mounting plate 44 through which clamp 20 is coupled to slider 32.

Grabber clamp 20 can pull an elongate binding material 12 from a bale 14 after the elongate binding material has been cut. Elongate binding material puller therefore can include an elongate binding material cutter 46. The elongate binding material cutter may be positioned at various locations including on table 18 as shown, at a side of the table or on the clamp. Once cut, the elongate binding material can be pulled by clamp 20 off the bale.

With reference to FIGS. 3a to 3d and 4a to 4i, another elongate binding material puller 110 is illustrated with further features.

Elongate binding material puller 110 is, as described above, for removing elongate binding material 12 from a bale 14. The elongate binding material puller includes a table 118 on which the bale 14 is supported and a grabber clamp 120 for grapping and pulling elongate binding material 12 from the bale. The grabber clamp is mounted above the table on a frame 128. Frame 128 includes base mounts 128a through which connection is made to side edges 118a of the table or onto the floor adjacent the table. Grabber clamp 120 is coupled to frame 128 by a mounting structure including an arm 122 and a track 134 that are configured to permit movement of the clamp both up and down and laterally, respectively. The elongate binding material puller further includes an elongate binding material cutter 146 and a bale conveyor 148 that moves the bales along the table in direction D. These components are according to the description and options noted above.

Figure 3A:
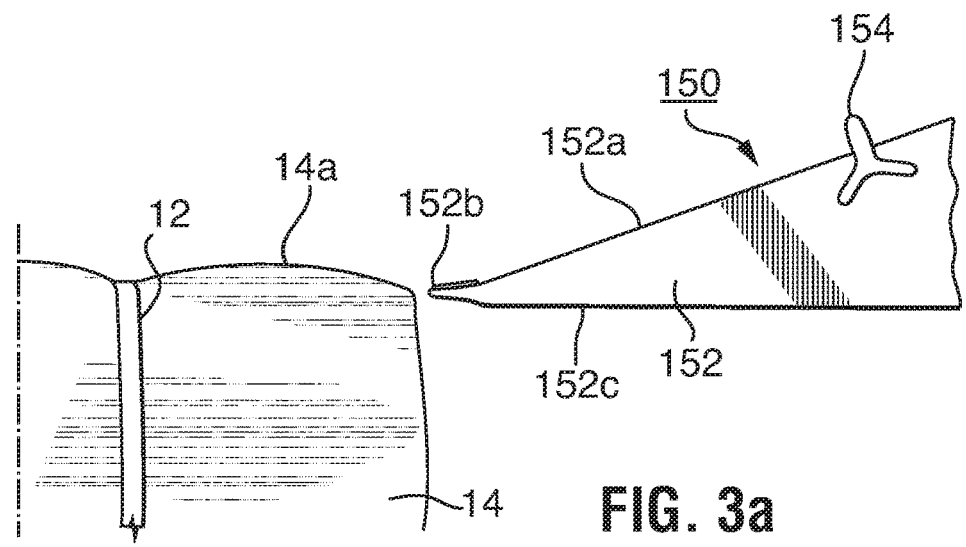
FIG. 3a is a schematic side elevation of an elongate binding material lifting structure and a bale in a first stage of operation.
Figure 3B:
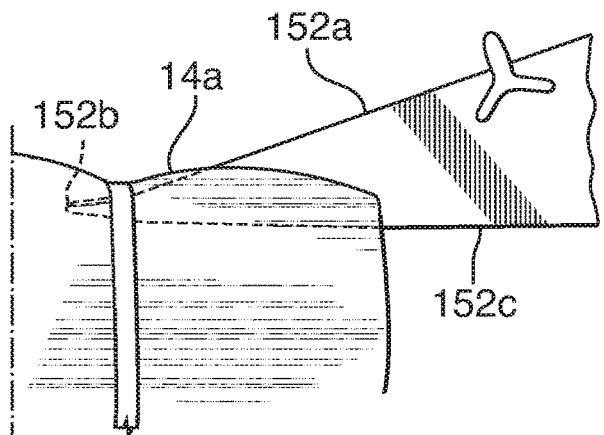
FIG. 3b is a schematic side elevation of the elongate binding material lifting structure and bale of FIG. 3a in a second stage of operation.
Figure 3C:
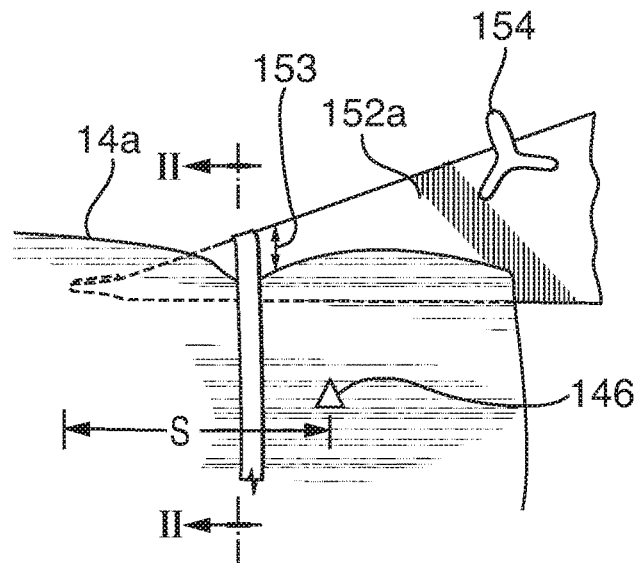
FIG. 3c is a schematic side elevation of the elongate binding material lifting structure and bale of FIG. 3a in a third stage of operation.
Figure 3D:
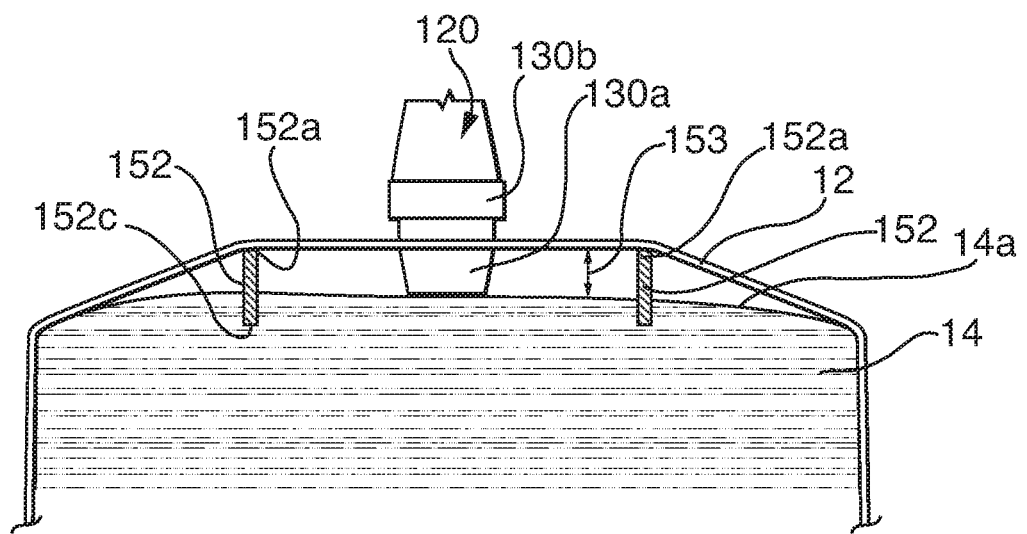
FIG. 3d is a sectional view along line II-II of FIG. 3c.
Figure 4A:
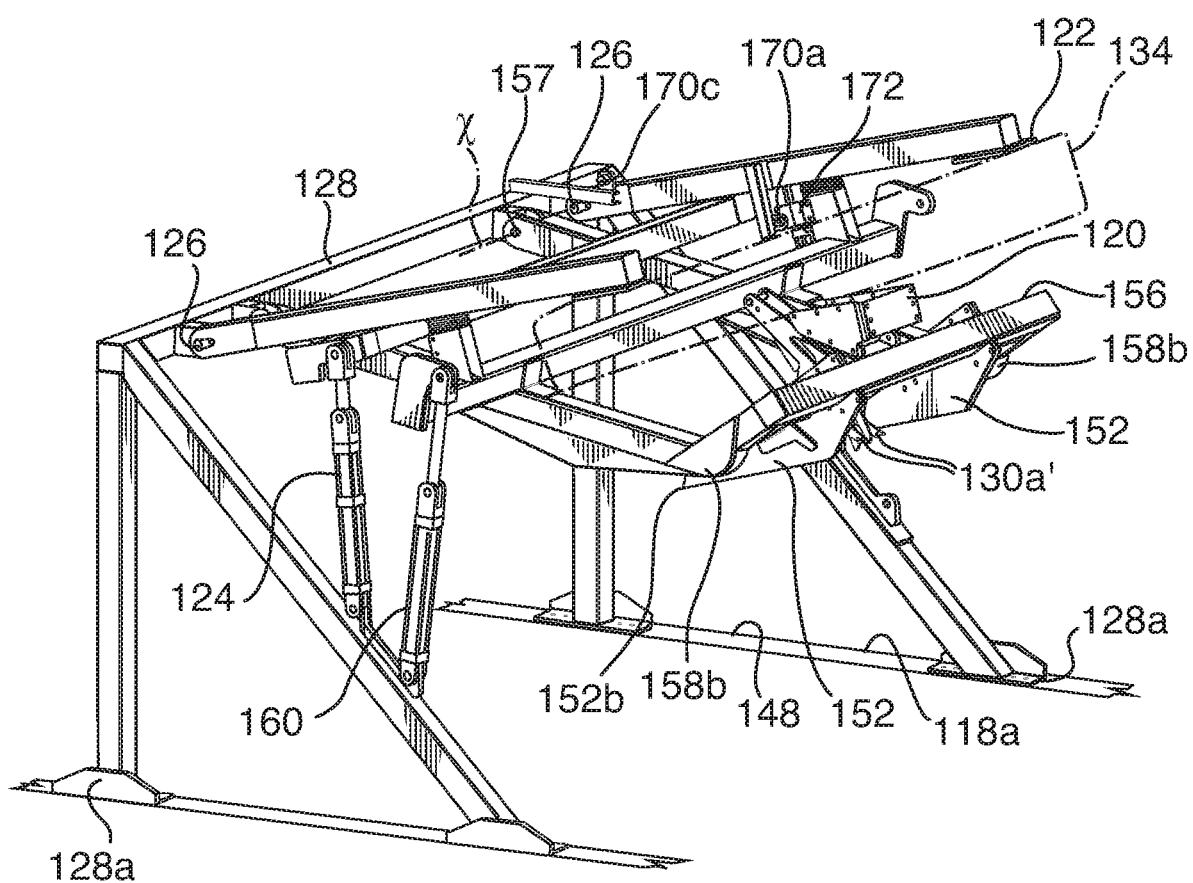
FIG. 4a is a top perspective view of a frame, a clamp arm, a clamp and an elongate binding material lifting structure of an elongate binding material puller according to one embodiment. A track between the clamp and the clamp arm is shown in phantom to more clearly illustrate the elongate binding material lifting structure.
Figure 4B:
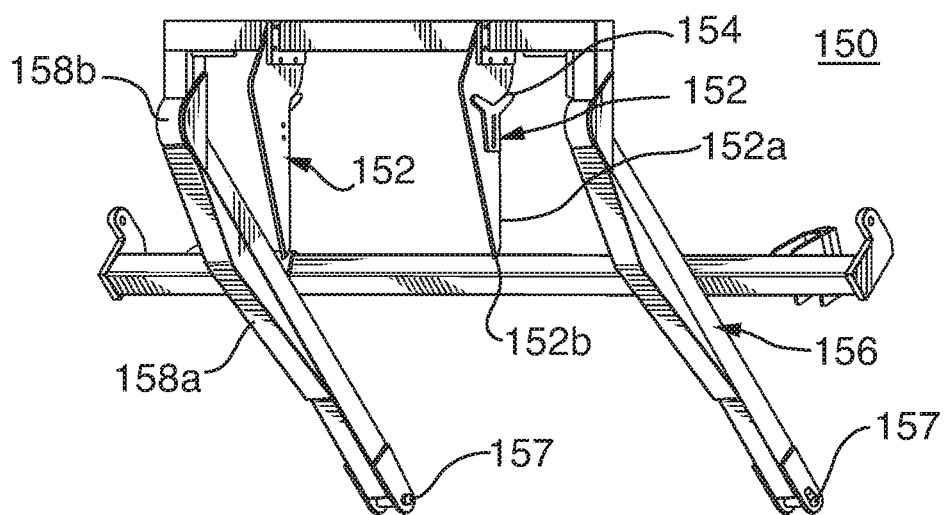
Figure 4C:
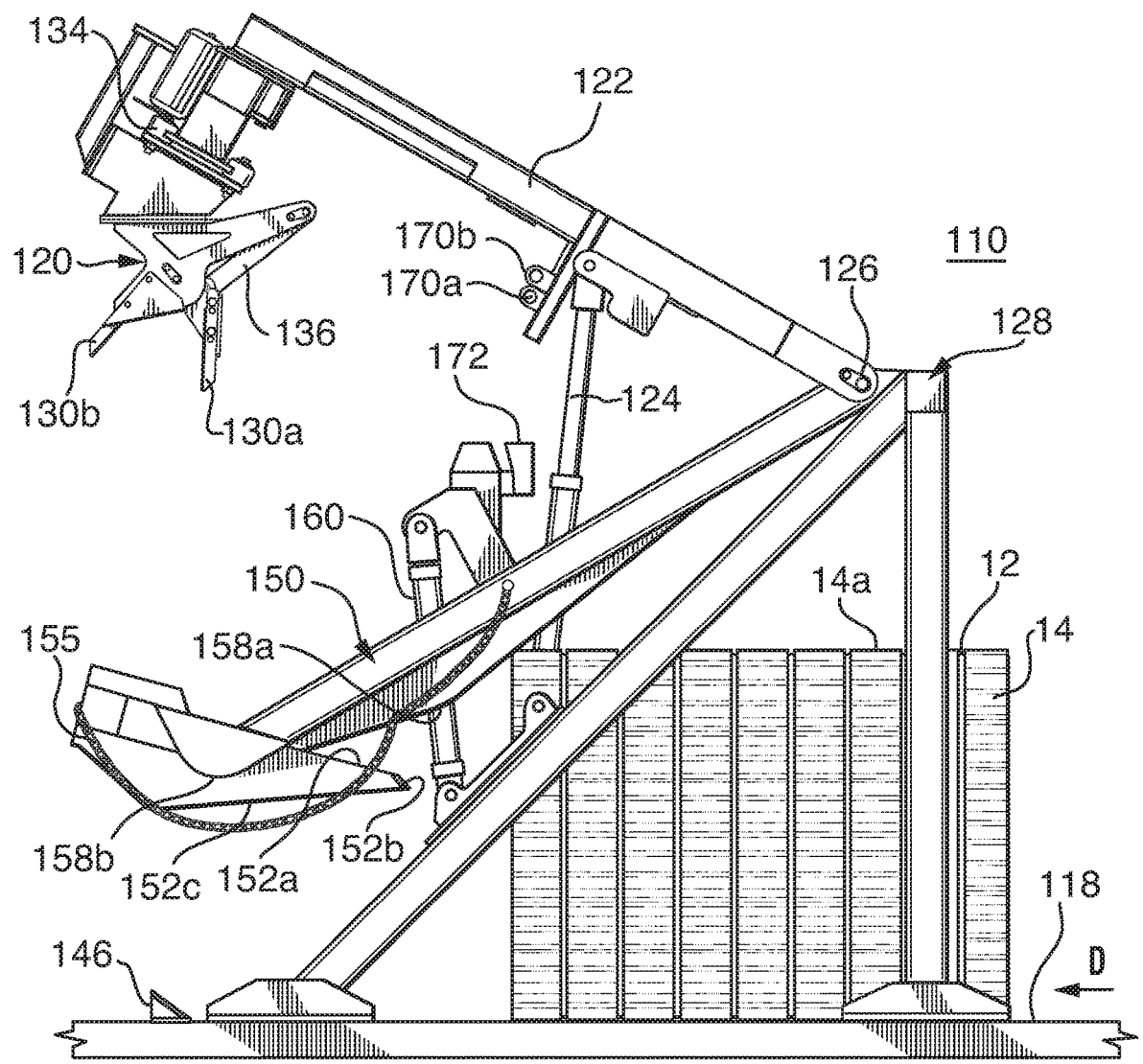
FIG. 4c is a side elevation of an elongate binding material puller according to one embodiment in a first stage of operation, with a bale approaching the puller.
Figure 4D:
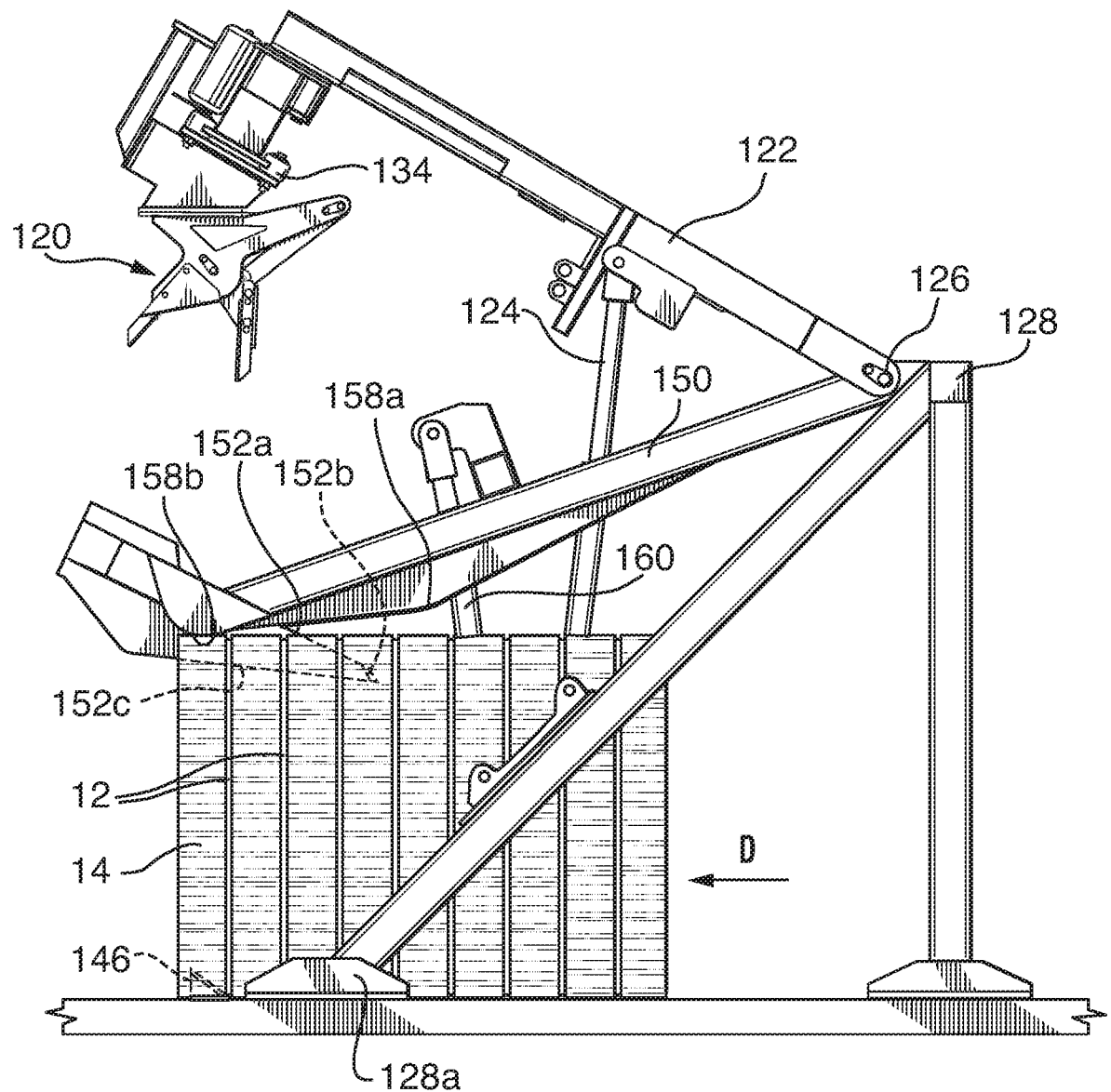
FIG. 4d is a side elevation of the puller of FIG. 4c in a next stage of operation, where the plows are riding along the upper surface of the bale and under the elongate binding material strands.
Figure 4E:
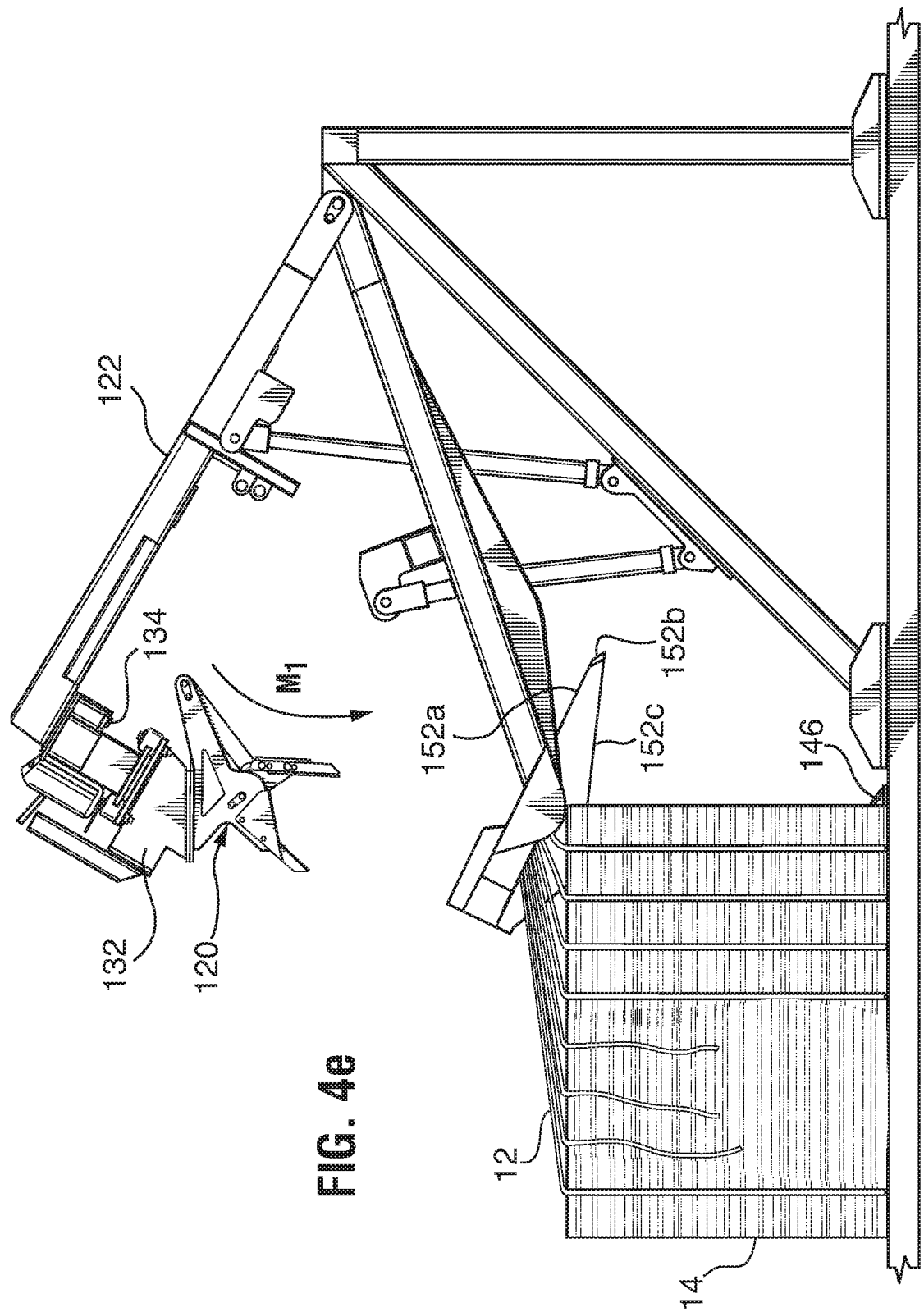
FIG. 4e is a side elevation of the puller in a next stage of operation, where the strands have been lifted by the plow and cut by the cutter. The clamp is ready to move down M1 and grasp the lifted strands.
Figure 4F:
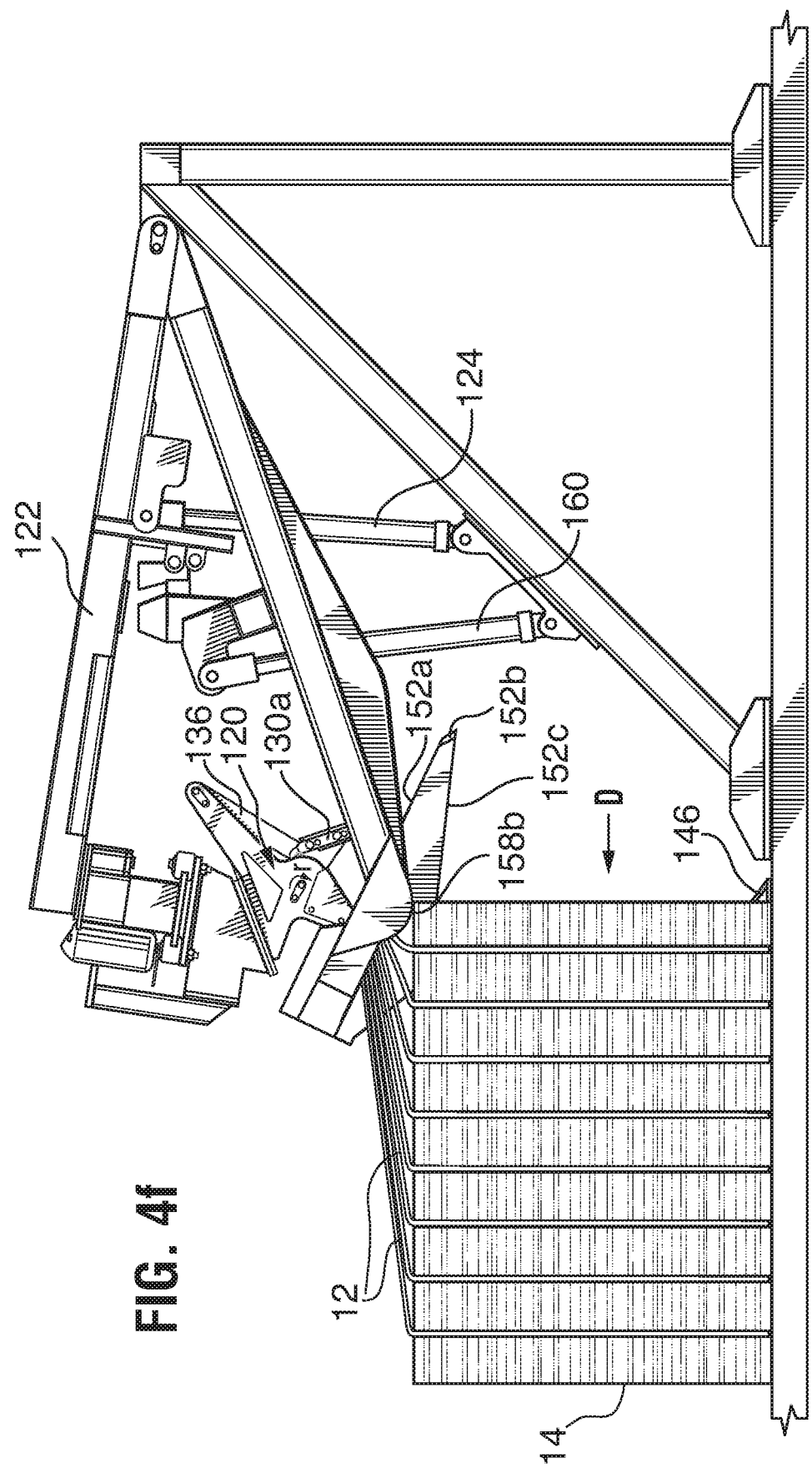
FIG. 4f is a side elevation of the puller in a next stage of operation after FIG. 4e, where the clamp has moved down between the plows and is ready to clamp onto the lifted strands.
Figure 4G:
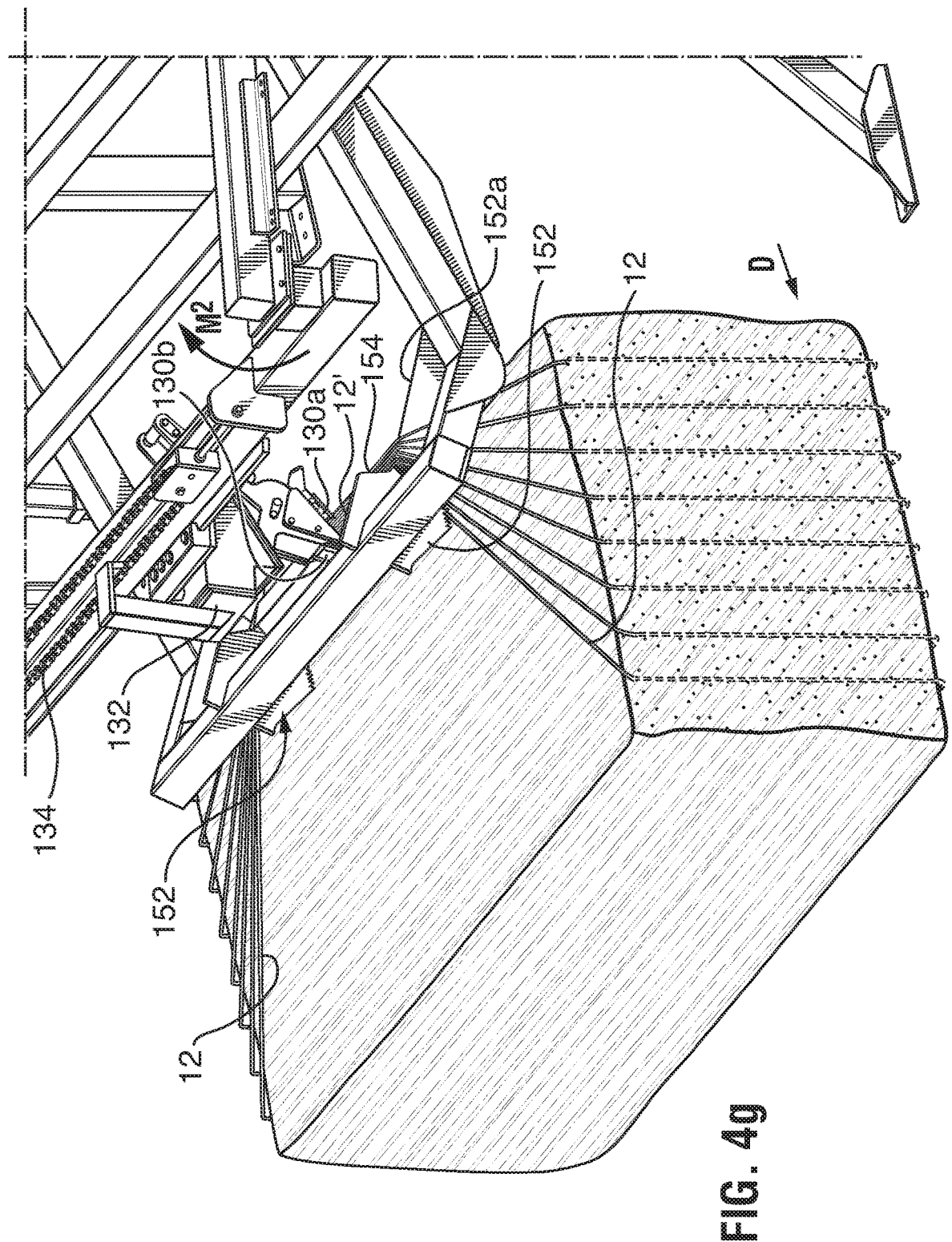
FIG. 4g is a top perspective view of the puller in a next stage of operation after FIG. 4f where the clamp has clamped onto the bundle of lifted strands stopped against the plow stop wall. The clamp is ready to be lifted up M2.
Figure 4H:
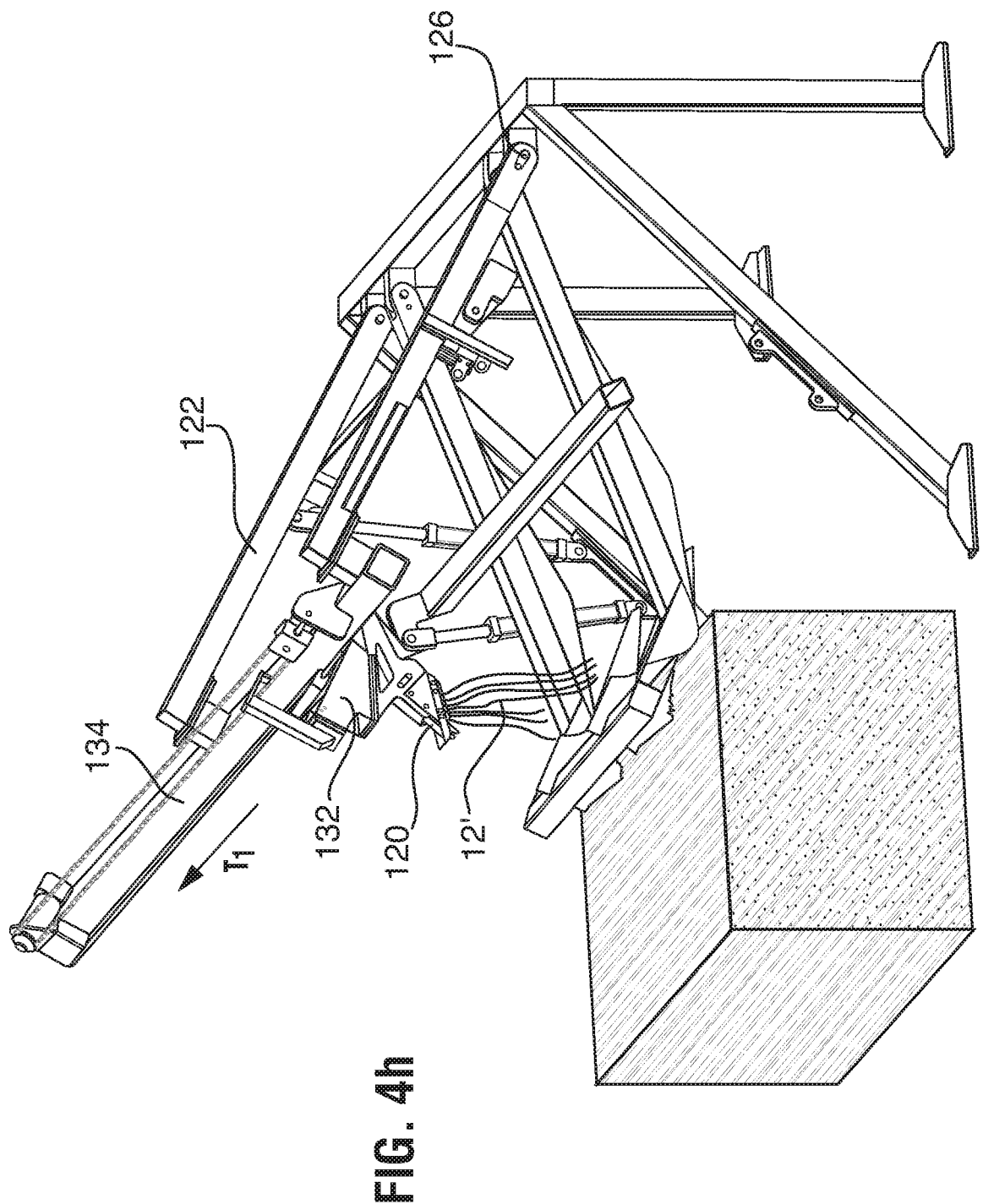
FIG. 4h is a top perspective view of the puller in a next stage of operation after FIG. 4g where the clamp has been lifted up while it remains clamped onto the bundle of strands, which pulls the elongate binding material strands away from the bale. The clamp is ready to be moved laterally T1 to a position aligned above a disposal area, which is laterally beyond a side edge of the puller.

This embodiment further includes an elongate binding material lifter. Due to the tension in the elongate binding material and the embedment of the elongate binding material into the bale surface 14a that sometimes occurs, it is sometimes difficult for the grabber clamp 120 to grasp the elongate binding material. Thus, as illustrated, the elongate binding material puller may include an elongate binding material lifting structure 150 that locates and lifts the elongate binding material such that the clamp can reliably grasp the elongate binding material. In one embodiment, the elongate binding material lifting structure 150 includes a plow 152 with a ramped body 152a that includes a tapered, sharpened leading end 152b capable of digging/cutting into the surface of the bale. The plow is configured and mounted on the elongate binding material puller to ride along the surface of the bale (FIG. 3a) and pass (FIG. 3b) under elongate binding material strands on the bale such that the elongate binding material strands ride up the ramped body. The ramped body 152a may include a flat underside 152c that follows the bale surface and ensures the tapered leading end rides closely along or just below the bale surface to insert below the elongate binding material. As the plow moves under the elongate binding material, the elongate binding material rides up the ramped body (FIGS. 3c and 3d). In so doing, a space 153 is formed between elongate binding material 12 and bale 14 that permits the clamp 120 to grab the elongate binding material with one jaw under and one jaw over.

In one embodiment (FIG. 3d), the elongate binding material puller may include two such plows 152 positioned alongside each other but spaced apart. Plows 152 may function similarly such that the elongate binding material is held spaced from the bale at two ramped bodies 152a and space 153 formed between the plows is maintained sufficient to facilitate grasping by the clamp. In such an embodiment, clamp 120 may be installed on frame 128 to be moveable into the space between the plows. For example, arm 122 may be positionable by operation of driver 124, track 134 and slide 132 into a position between the plows 152 to grasp the elongate binding material that is lifted up.

Elongate binding material lifting structure 150 can be inserted under a plurality of strands of elongate binding material and hold all of them on the one or more ramped bodies 152a to be grasped all at once by clamp 120. For example, when elongate binding material puller 110 includes conveyor 148, the bale can be pushed against elongate binding material lifting structure 150 to lift and bundle a number of elongate binding material strands before they are grasped by clamp 120. One or both plows 152 may include elongate binding material stops 154 that stop the elongate binding material from riding further up the ramped bodies 152a and cause the elongate binding materials to accumulate and bundle for grasping. Stops 154 may be an attachment (FIG. 4b) or a step (FIG. 4g) on ramped body 152a.

Since the operation of plow 152 may rely on there being some tension in the elongate binding material, in such an embodiment, elongate binding material cutter 146 may be configured to only cut the elongate binding material when the elongate binding material has ridden at least partially up the ramped body 152a. In an elongate binding material puller with a conveyor 148, elongate binding material cutter 146 can be positioned along the axis of the conveyor's direction of travel a distance S axially after the leading end 152b of the plow. In such an embodiment, a bale being moved along the conveyor will first have its elongate binding material acted upon by the plow before cutter 146 acts to cut the lifted elongate binding material. The elongate binding material cutter knife is positioned such that the elongate binding materials will have migrated at least part way up the inclined ramped body before they are cut. In one embodiment, cutter 146 is positioned on table 118 in the conveyor 148 at substantially the same axial location as the stop 154.

It is noted that bales come in various shapes and sizes. Even with square or rectangular bales, they can vary between about 3 to 4 feet in height. In one embodiment, therefore, it is useful to mount elongate binding material lifting plow 152 on a locating device that senses the height of the bale and positions the plow accordingly to ensure it rides along the surface 14a of the bale and is aligned to locate and lift the elongate binding material strands. Locating device may include a mechanical structure, a proximity sensor, electronics, etc. However, a rugged and reliable device includes lifting structure plow 152 coupled to a gate 156 that hangs above conveyor 148. Gate 156 is hingeably connected at hinge 157 to frame 128 and hangs down above conveyor 148 with a space between the gate and the conveyor that is less than the smallest possible height of a bale, such that any bale passing thereunder must push against the gate. Gate 156 carries plow 152 at its outboard end. Plow 152 projects from the lower side of gate 156 with leading end 152b projecting out from and below the gate and the ramped portion 152a extending axially aligned with the long axis of conveyor and pointing in a direction opposite direction D back toward hinge 157.

Gate 156 may include a kicker 158 on its lower side to find and ride over a top surface 14*a* of a bale passing under the gate. Kicker 158 and gate 156 are configured to locate the top of a bale and position plow 152, which is carried on gate, at the correct height to insert under elongate binding material strands on the bale but not dig too deep into the bale. Kicker components such as a ski 158*a* and/or an elbow 158*b* are each rounded and broad, and are bent at the elbow, such that elbow 158*b* points down, or in a direction opposite direction D, when the gate hangs down, projected from the gate and are positioned relative to plow 152 to ensure that plow leading end is positioned and maintained to ride along or just below the bale surface, rather than digging too deep or progressively deeper into the bale material. Skis 158*a* are oriented ahead of, aligned with or slightly offset from, leading end 152*b* of the plow. Elbow 158*b* is fixed at a distance D1 above the base 152*c* of the plow and protrudes laterally beyond at least one side edge of the plow to prevent the plow from penetrating more than the distance D1 into the bale. Plow 152 may be removable such that it can be repositioned or replaced.

Gate 156 may further include chains 155 or the like. Such chains may be affixed to the sides of the gate and hang below it such that, in use, the chains bear down on the upper surface or sides of bales to hold the elongate binding material in place during processing. In particular, when cut, sometimes the binding material may flip up and be loose on top of the bale. Chains ride over the bale and hold the binding material down such that it can be acted upon by plow 152 and clamp 120.

Gate 156 may be supported on a strut 160 to damp its movement and prevent it from dropping down onto its mechanical stops or the conveyor. Strut 160 may be configured to hold gate at an angle relative to conveyor 148. Strut 160 here is a shock dampening cylinder. Strut 160 may be configured to pull down on the gate to make contact with the bale during processing. In other words, strut 160 may be configured to lift and lower the gate, or absorb shocks in either direction.

The gate and plow plates, therefore, act as a structure which rides along the top of the bale, as the bale is moved under/past it. The plow leading ends are effectively blades that penetrate the bale surface and allow embedded elongate binding materials to be lifted along ramped body 152*a* away from the bale surface. The gate and plow plates are rigid structures but are hingeably connected to stationary frame member 128, which allows the gate and plows to ride along the top of a bale as the bale is pushed by conveyor 148 through the elongate binding material puller. The weight of the gate forcibly buries the plow plates in the bale, reaching into the top surface 14*a* of the bale below any elongate binding materials, even ones that are embedded. The action of moving the bale through the elongate binding material puller, past the lifting structure, will force the elongate binding materials before they are cut to migrate up the inclined ramped body 152*a*, which raises them up free of the top surface of the bale to make them easier to accumulate. Also, the spacing between the bale and bundle 12' minimizes the amount of bale material also picked up with the elongate binding material, which is beneficial for recycling the binding material.

Once the lifting structure lifts the elongate binding material, clamp 120 can be driven down M1 to grab the elongate binding material from on top of the plows 152*a*. Because of the space 153, the clamp jaws 130*a*, 130*b* can selectively clamp on the lifted elongate binding material without also grabbing bale material.

The clamp 120 is coupled onto track 134. Track 134 is illustrated as a hydraulically actuated, chain drive linear track mechanism used to transport the clamp from an elongate binding material pick up location (FIG. 4*g*), which is a position centrally above table 118, and specifically centrally between plows 152, to an elongate binding material deposit location (FIG. 4*i*) where the clamp is positioned laterally beyond a side edge 118*a* of the table. In this position, the elongate binding material can be released from the clamp. The track 134 is connected to arm 122 that is hingeably connected by hinge connection 126 to stationary frame 128 above table 118. Arm 122 is powered by one or more hydraulic cylinder 124 to lift and lower the track, and thereby clamp 120, toward and away from plow 152. Hinge connection 126 is common to the hinge pivot axis of gate 156 and both arm 122 and gate 156 are supported on a common frame 128. The common axis of the hinges allows the clamp to be lowered to a consistent and repeatable position relative to the plow carried on the gate, which is where the elongate binding materials are accumulated as the bale is moved along the conveyor.

Overall, once the clamp has been hydraulically powered to clamp onto the accumulated elongate binding material bundle 12' on the plow (FIG. 4*g*), arm 122 is driven by cylinder 124 to be raised up M2 from the plow and then track 134 is powered to move slider 132 and clamp 120 laterally to the elongate binding material deposit position. Once the clamp is above the elongate binding material deposit position, the clamp is actuated to open and release its grip on the elongate binding material, such that the elongate binding material can be dropped into a deposit location offset from table 118.

The puller can be operated manually or automatically. The movement of the clamp, including operation of the jaws driver 136 to open and close the clamp, arm 122 and track 134 may be controlled automatically via a control system. The control system may include a central controller such as a PLC and a sensor array, such as to generate proximity sensor inputs for component positions. Sensor array may include for example, sensors 170*a*, 170*b*, 170*c* on arm 122. Sensors 170*a*, 170*b*, for example, are positioned and configured to locate a flag 172 on gate 156. When sensors 170*a*, 170*b* indicate that they are straddling flag 172, the control system determines that clamp 120 is down properly in an elongate binding material pick up position between plows (FIG. 4*g*) and slide 132 cannot be moved laterally T1. When the sensor 170*c* senses that arm 122 is raised up, the control system determines that clamp is raised away from gate 156 and can be driven laterally T1/T2. Sensors could be replaced by mechanical stops. Hydraulic controllers could also be employed. A grunt timer may be employed for example which configures the hydraulic system for driver 136 to apply consistent cylinder force and leave the hydraulic force on the cylinder until it is opened. This permits the clamp grip to be readily tightened to counteract binding material slippage. In one embodiment, peak pressure could be limited to grab variable bundles with equal pressure.

In one embodiment, the system, after clamping binding material and when lifting arm, may operate to repeatably cycle arm 122 between movements up M2 and down M1, such that a jerking action is applied to strands. This jerking action facilitates removal of embedded strands.

Although embodiment options are described separately in the various figures, the embodiments can be employed alone or in various combinations.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A grabber clamp comprising:
a first jaw with a forward end and a rear end;
a second jaw with a forward end, the second jaw configured to (i) move toward the first jaw to close the first and second jaws and (ii) move away from the first jaw, to open the first and second jaws; and
a driver for driving movement of the first jaw and the second jaw to open and close;
wherein the first jaw includes a first gripping face and the second jaw includes a second gripping face, the first and second gripping faces being shaped to come into contact when the first jaw and the second jaw are closed to define a first blunt clamping point, where a first surface exposed on the first gripping face contacts and butts against a second flat, elongate surface on the second gripping face, and a second blunt clamping point, where a third portion of the first gripping face contacts a fourth portion of the second gripping face and the second blunt clamping point is spaced from the first blunt clamping point and there is a non-clamping area between the first and second blunt clamping points.

2. The grabber clamp of claim 1 wherein the first surface is flat from side to side and elongate in a direction extending between the forward end and the rear end.

3. The grabber clamp of claim 2 wherein the first surface defines a first plane and the second blunt clamping point defines a second plane spaced from the first plane.

4. The grabber clamp of claim 3 wherein the first plane is non-parallel to the second plane.

5. The grabber clamp of claim 1 further comprising (i) an elongate groove on the first gripping face between the first blunt clamping point and the second blunt clamping point and (ii) an elongate projection on the second gripping face between the first blunt clamping point and the second blunt clamping point, and wherein a base of the elongate groove and a top surface of the elongate projection define a third blunt clamping point between the first jaw and the second jaw.

6. The grabber clamp of claim 5 further comprising an open gap between the first blunt clamping point and the third blunt clamping point.

7. The grabber clamp of claim 1 wherein the first gripping face has a concave curvature in the direction extending between the forward end and the rear end and the second gripping face meshes into and overlaps with at least front and rear portions of the first gripping face.

8. The grabber clamp of claim 7 wherein the concave curvature creates a deeper region between the terminal end and the rear end of the first jaw configured to urge elongate binding material into the deeper area.

9. The grabber clamp of claim 1 wherein the forward end of the first jaw projects toward the second jaw and the forward end of the second jaw projects toward the first jaw and the first and second jaws overlap at the forward ends when closed.

10. The grabber clamp of claim 1 further comprising a third blunt clamping point and a fourth blunt clamping point and wherein (a) the first blunt clamping point includes a first surface exposed on the first gripping face, which is flat from side to side and elongate in a direction extending between the forward end and the rear end and a flat, elongate surface on the second gripping face aligned with the first surface and configured to butt against the first surface when the first jaw and second jaw are closed and to define a first plane; (b) the second blunt clamping point includes a second surface exposed on the first gripping face, which is flat from side to side and elongate in the direction extending between the forward end and the rear end and a second flat, elongate surface on the second gripping face aligned with the second surface and configured to butt against the second surface when the first jaw and second jaw are closed and to define a second plane, the second plane being spaced from but parallel to the first plane; and (c) the third blunt clamping point and the fourth blunt clamping point each include aligned planar elongate surfaces on each of the first gripping face and the second gripping face, the aligned planar elongate surfaces defining planes that are parallel to each other but non-parallel to the first plane and the second plane.

11. The grabber clamp of claim 10 wherein the first and second blunt clamping points are at outer side edges of the first gripping face and the third and fourth blunt clamping points are positioned inbetween the first and second blunt clamping points.

12. The grabber clamp of claim 10 wherein the first and second blunt clamping points extend at a first angle in the direction from the terminal end to the rear end and the third and fourth blunt clamping points extend at a steeper angle than the first angle.

13. The grabber clamp of claim 10 wherein the first surface exposed on the first gripping face extends at a first angle; a third surface on the first gripping face defines one half of the third blunt clamping point and the third surface extends alongside the first surface and is oriented at an angle different from the first angle such that in side view the third surface slopes behind the first surface and the overall side curvature of the first gripping face is concave.

14. The grabber clamp of claim 10 further comprising a first open gap between the first blunt clamping point and the third blunt clamping point and a second open gap between the third blunt clamping point and the fourth blunt clamping point.

15. An elongate binding material puller for removing elongate binding material from a bale, the elongate binding material puller comprising:
a table surface;
a grabber clamp mounted above the table surface and the grabber clamp including:
a. a first jaw;

b. a second jaw moveable relative to the first jaw, the first and second jaws each including a forward end opposite a rear end; and c. a jaws driver for driving movement of at least one of the first jaw and the second jaw to open and close the clamp;

a conveyor for driving the bale along a path in a direction of travel over the table surface past the grabber clamp; and an elongate binding material lifting structure mounted to extend out axially aligned with the direction of travel and configured with a kicker supported in the path through which the bale travels for locating and riding along an upper surface of the bale and cutting into the bale upper surface to insert below the elongate binding material and to lift the elongate binding material away from the upper surface of the bale for gripping by the grabbing clamp.

16. The elongate binding material puller of claim 15 further comprising a clamp driver for moving the grabber clamp up and down and side to side relative to the table surface.

17. A grabber clamp comprising:
a first jaw with a forward end and a rear end;
a second jaw with a forward end, the second jaw configured to (i) move toward the first jaw to close the first and second jaws and (ii) move away from the first jaw, to open the first and second jaws; and
a driver for driving movement of the first jaw and the second jaw to open and close;
wherein the first jaw includes a first gripping face and the second jaw includes a second gripping face, the first and second gripping faces being configured to come together when closed to define a first blunt clamping point and a second blunt clamping point spaced from the first blunt clamping point and a non-clamping area between the first and second blunt clamping points;
an elongate groove on the first gripping face between the first blunt clamping point and the second blunt clamping point; and
an elongate projection on the second gripping face between the first blunt clamping point and the second blunt clamping point, and
wherein a base of the elongate groove and a top surface of the elongate projection define a third blunt clamping point between the first jaw and the second jaw.

18. The grabber clamp of claim 17 wherein the first blunt clamping point includes a first surface exposed on the first gripping face, the first surface being flat from side to side and elongate in a direction extending between the forward end and the rear end and a second flat, elongate surface on the second gripping face aligned with the first surface and configured to butt against the first surface when the first jaw and second jaw are closed.

19. The grabber clamp of claim 18 wherein the first surface defines a first plane and the second blunt clamping point defines a second plane spaced from the first plane.

20. The grabber clamp of claim 19 wherein the first plane is non-parallel to the second plane.

21. The grabber clamp of claim 17 further comprising an open gap between the first blunt clamping point and the third blunt clamping point.

22. A grabber clamp comprising:
a first jaw with a forward end and a rear end;
a second jaw with a forward end, the second jaw configured to (i) move toward the first jaw to close the first and second jaws and (ii) move away from the first jaw, to open the first and second jaws; and
a driver for driving movement of the first jaw and the second jaw to open and close;
wherein the first jaw includes a first gripping face and the second jaw includes a second gripping face, the first and second gripping faces being configured to come together when closed to define a first blunt clamping point and a second blunt clamping point spaced from the first blunt clamping point and a non-clamping area between the first and second blunt clamping points; and
wherein the first gripping face has a concave curvature in the direction extending between the forward end and the rear end and the second gripping face meshes into and overlaps with at least front and rear portions of the first gripping face.

23. The grabber clamp of claim 22 wherein the concave curvature creates a deeper region between the terminal end and the rear end of the first jaw configured to urge elongate binding material into the deeper area.

24. The grabber clamp of claim 22 wherein the forward end of the first jaw projects toward the second jaw and the forward end of the second jaw projects toward the first jaw and the first and second jaws overlap at the forward ends when closed.

25. A grabber clamp comprising:
a first jaw with a forward end and a rear end;
a second jaw with a forward end, the second jaw configured to (i) move toward the first jaw to close the first and second jaws and (ii) move away from the first jaw, to open the first and second jaws;
a driver for driving movement of the first jaw and the second jaw to open and close;
wherein the first jaw includes a first gripping face and the second jaw includes a second gripping face, the first and second gripping faces being configured to come together when closed to define a first blunt clamping point and a second blunt clamping point spaced from the first blunt clamping point and a non-clamping area between the first and second blunt clamping points;
a third blunt clamping point; and
a fourth blunt clamping point, and
wherein (a) the first blunt clamping point includes a first surface exposed on the first gripping face, which is flat from side to side and elongate in a direction extending between the forward end and the rear end and a flat, elongate surface on the second gripping face aligned with the first surface and configured to butt against the first surface when the first jaw and second jaw are closed and to define a first plane; (b) the second blunt clamping point includes a second surface exposed on the first gripping face, which is flat from side to side and elongate in the direction extending between the forward end and the rear end and a second flat, elongate surface on the second gripping face aligned with the second surface and configured to butt against the second surface when the first jaw and second jaw are closed and to define a second plane, the second plane being spaced from but parallel to the first plane; and (c) the third blunt clamping point and the fourth blunt clamping point each include aligned planar elongate surfaces on each of the first gripping face and the second gripping face, the aligned planar elongate surfaces defining planes that are parallel to each other but non-parallel to the first plane and the second plane.

26. The grabber clamp of claim 25 wherein the first and second blunt clamping points are at outer side edges of the first gripping face and the third and fourth blunt clamping points are positioned in between the first and second blunt clamping points.

27. The grabber clamp of claim 25 wherein the first and second blunt clamping points extend at a first angle in the direction from the terminal end to the rear end and the third and fourth blunt clamping points extend at a steeper angle than the first angle.

28. The grabber clamp of claim 25 wherein the first surface exposed on the first gripping face extends at a first angle; a third surface on the first gripping face defines one half of the third blunt clamping point and the third surface extends alongside the first surface and is oriented at an angle different from the first angle such that in side view the third surface slopes behind the first surface and the overall side curvature of the first gripping face is concave.

29. The grabber clamp of claim 25 further comprising a first open gap between the first blunt clamping point and the third blunt clamping point and a second open gap between the third blunt clamping point and the fourth blunt clamping point.

\* \* \* \* \*